(12) United States Patent
Lum et al.

(10) Patent No.: US 11,961,005 B1
(45) Date of Patent: Apr. 16, 2024

(54) SYSTEM FOR AUTOMATED DATA PREPARATION, TRAINING, AND TUNING OF MACHINE LEARNING MODELS

(71) Applicant: Storytellers.ai LLC, Issaquah, WA (US)

(72) Inventors: Kirsten Rae Lum, Issaquah, WA (US); Wing Yew Lum, Issaquah, WA (US); Erin Marie Torgerson, Issaquah, WA (US); Garrett Alan Fiddler, Bothell, WA (US)

(73) Assignee: Storytellers.ai LLC, Issaquah, WA (US)

( * ) Notice: Subject to any disclaimer, the term of this patent is extended or adjusted under 35 U.S.C. 154(b) by 0 days.

(21) Appl. No.: 18/544,043

(22) Filed: Dec. 18, 2023

(51) Int. Cl.
   *G06N 3/09* (2023.01)
   *G06N 3/0455* (2023.01)

(52) U.S. Cl.
   CPC .............. *G06N 3/09* (2023.01); *G06N 3/0455* (2023.01)

(58) Field of Classification Search
   CPC ........ G06N 20/00; G06N 3/045; G06N 20/20; G06N 3/08; G06N 3/084; G06N 5/01; G06N 7/01; G06N 3/047; G06N 5/022; G06N 5/04; G06N 20/10; G06N 3/04; G06N 3/044; G06N 3/0455; G06N 3/096; G06N 3/088; G06N 5/02; G06N 3/09; G06F 18/214; G06F 16/285; G06F 18/2148; G06F 18/23213; G06V 10/82; G06V 10/7753

See application file for complete search history.

(56) References Cited

U.S. PATENT DOCUMENTS

| | | | |
|---|---|---|---|
| 9,454,576 B1 | 9/2016 | Kapoor et al. | |
| 10,885,160 B1 * | 1/2021 | Guo | ........................ G06N 20/00 |
| 11,544,796 B1 * | 1/2023 | Mohamed | ............ G06N 3/0985 |
| 11,580,127 B1 | 2/2023 | Newman | |
| 11,693,637 B1 * | 7/2023 | Singh | ..................... G06N 3/045 |
| | | | 717/139 |

(Continued)

OTHER PUBLICATIONS

Office Communication for U.S. Appl. No. 18/371,931 dated Feb. 5, 2024, 15 Pages.

(Continued)

*Primary Examiner* — Michael S Osinski
(74) *Attorney, Agent, or Firm* — John W. Branch; Branch Partners PLLC

(57) ABSTRACT

Embodiments are directed to managing machine learning models. Domain items may be determined based on domain data and schema information. Labels that correspond to a predicted outcome may be generated based on the domain data. A model may be trained based on a portion of a plurality of feature records and the labels such that each feature record may be associated with an observance of a domain item. The trained model may be disqualified based on evaluation metrics that may be below a threshold value causing further actions, including: submitting other portions of the feature records to the disqualified model; determining erroneous feature fields in the feature records based on metrics associated with the submission of the other portions of feature records; updating the feature records to exclude the erroneous feature fields; retraining the disqualified model based on the updated feature records.

28 Claims, 17 Drawing Sheets

(56) References Cited

U.S. PATENT DOCUMENTS

| | | | |
|---|---|---|---|
| 11,734,937 B1* | 8/2023 | Pushkin | G06V 30/10 |
| | | | 706/12 |
| 11,816,573 B1 | 11/2023 | Garvey et al. | |
| 2009/0271345 A1 | 10/2009 | Rich et al. | |
| 2015/0254555 A1* | 9/2015 | Williams, Jr. | G06N 3/045 |
| | | | 706/14 |
| 2016/0350369 A1 | 12/2016 | He et al. | |
| 2017/0236060 A1* | 8/2017 | Ignatyev | G06N 5/01 |
| | | | 706/46 |
| 2018/0004722 A1 | 1/2018 | Naor | |
| 2019/0205794 A1* | 7/2019 | Hsu | G06N 20/20 |
| 2019/0332697 A1 | 10/2019 | Williams et al. | |
| 2019/0340240 A1 | 11/2019 | Duta | |
| 2020/0207358 A1* | 7/2020 | Katz | G02B 27/0093 |
| 2020/0250491 A1* | 8/2020 | Peng | G06F 18/2148 |
| 2020/0401948 A1* | 12/2020 | Ma | G06F 11/3495 |
| 2021/0073669 A1* | 3/2021 | Banerjee | G06N 3/045 |
| 2021/0232966 A1* | 7/2021 | Elisha | G06Q 10/10 |
| 2022/0027782 A1* | 1/2022 | MacManus | G06N 20/00 |
| 2022/0058504 A1* | 2/2022 | Malhotra | G06N 20/20 |
| 2022/0101180 A1* | 3/2022 | Bhide | G06F 18/2113 |
| 2022/0180200 A1* | 6/2022 | Yu | G06V 10/774 |
| 2022/0222526 A1* | 7/2022 | Hawkins | G06N 3/08 |
| 2022/0350967 A1* | 11/2022 | Vijayaraghavan | |
| | | | G06Q 10/0631 |
| 2023/0057414 A1* | 2/2023 | Larkin | G06N 7/02 |
| 2023/0062114 A1 | 3/2023 | Rout et al. | |
| 2023/0099164 A1 | 3/2023 | Buford et al. | |
| 2023/0142105 A1* | 5/2023 | Pita | G06N 20/20 |
| | | | 705/7.23 |
| 2023/0196115 A1* | 6/2023 | Arnon | G06N 3/08 |
| | | | 706/25 |
| 2023/0289587 A1* | 9/2023 | Shen | G06Q 90/00 |
| 2023/0297653 A1* | 9/2023 | Das | G06N 5/045 |
| | | | 726/18 |
| 2023/0306445 A1* | 9/2023 | Kaitha | G06Q 30/0631 |
| 2023/0315811 A1* | 10/2023 | Chai | G06F 18/2193 |
| | | | 706/12 |
| 2023/0342344 A1 | 10/2023 | Brown et al. | |
| 2023/0368043 A1* | 11/2023 | Macklin | G06N 5/022 |
| 2023/0377747 A1* | 11/2023 | Molero Leon | G16H 10/60 |
| 2023/0401829 A1* | 12/2023 | Liu | G06V 10/7753 |
| 2023/0409766 A1* | 12/2023 | Narayana | G06F 30/13 |
| 2024/0037145 A1* | 2/2024 | Ziccardi | G06F 40/56 |
| 2024/0040201 A1* | 2/2024 | Lee | H04N 21/4532 |

OTHER PUBLICATIONS

Office Communication for U.S. Appl. No. 18/371,931 dated Jan. 3, 2024, 13 Pages.

* cited by examiner

SYSTEM FOR AUTOMATED DATA PREPARATION, TRAINING, AND TUNING OF MACHINE LEARNING MODELS

TECHNICAL FIELD

These innovations relate generally to data management, and more particularly, but not exclusively, to automated data preparation, training, or tuning of machine learning models.

BACKGROUND

Organizations are generating and collecting an ever increasing amount of data associated with various aspects of their operations, including consumer activity, manufacturing activity, customer service, quality assurance, or the like. For various reasons, it may be difficult for such organizations to effectively utilize their vast collections of data. In some cases, the quantity of data may make it difficult to effectively utilize the collected data to improve business practices. One way to gain value from this enormous amount of information is to use it to train machine learning models. Such models may be utilized to predict various outcomes, classify customers, classify products, or the like. However, often creating useful machine learning models may be time consuming or resource intensive. Further, the processes for creating or evaluating machine learning models may often require significant manual or ad hoc operations that may introduce distortions or errors based on subjective decision making by the persons who are designing or evaluating machine learning models. Thus, it is with respect to these considerations and others that the invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
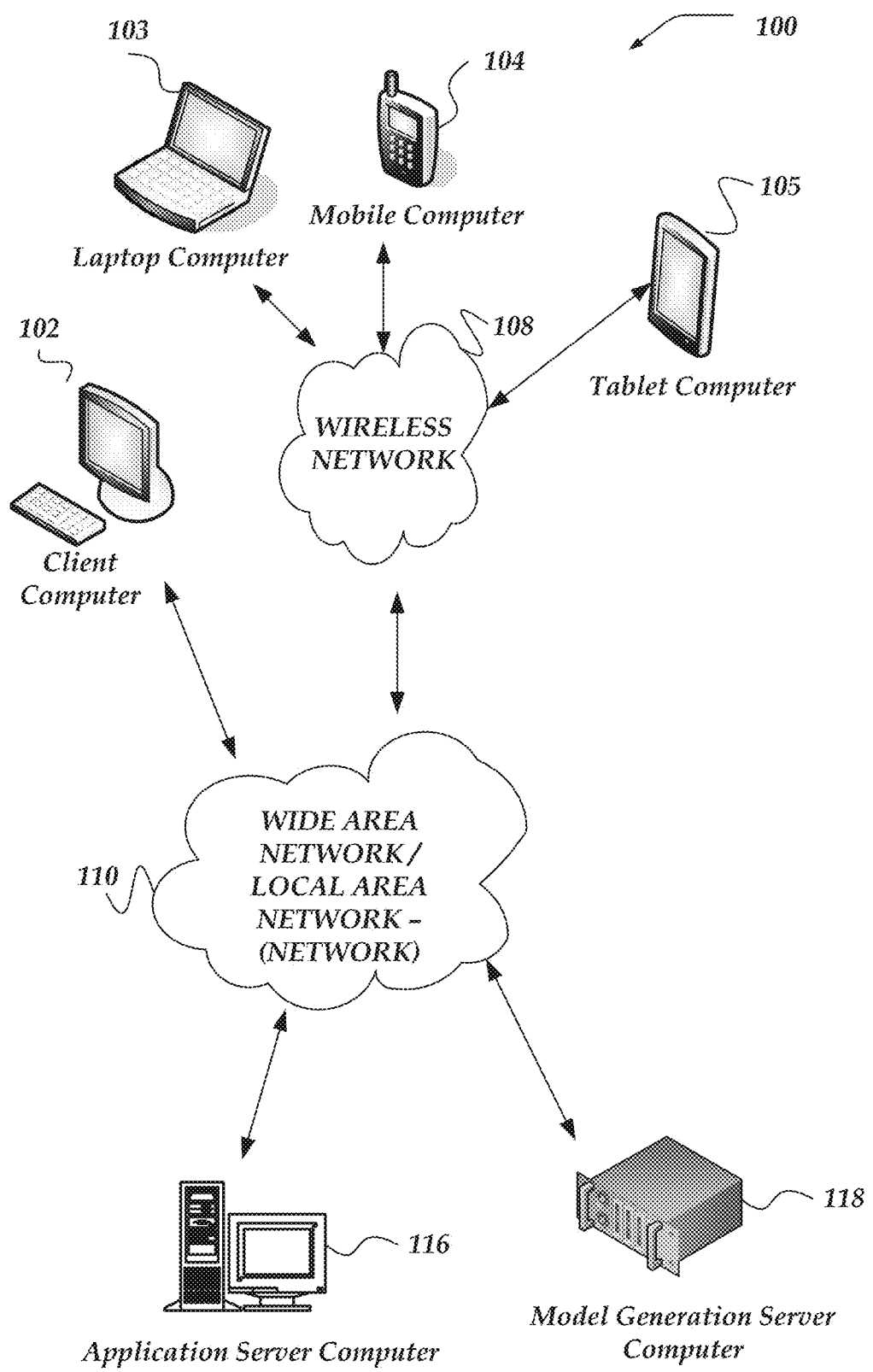
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which these innovations may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of these innovations.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example, embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java, PHP, Perl, Python, R, Julia, JavaScript, Ruby, VBScript, Microsoft .NET languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable mediums or computer storage devices and be stored on and executed by one or more general purpose computers, thus creating a special purpose computer configured to provide the engine.

As used herein, the terms "large language model," or "LLM" refer to data structures, programs, or the like, that may be trained or designed to perform a variety of natural language processing tasks. Typically, LLMs may generate text responses in response to text based prompts. Often, LLMs may be considered to be neural networks that have been trained on large collections of natural language source documents. Accordingly, in some cases, LLMs may be trained to generate predictive responses based on provided prompts. LLM prompts may include context information, examples, or the like, that may enable LLMs to generate responses directed to specific queries or particular problems that go beyond conventional NLP.

As used herein, the term "prompt" refers to one or more data structures that contain or represent prompt information that may be provided to LLMs.

As used herein the term "concrete data type" refers to data types such as integers, floating point values, characters/bytes, strings, or the like, that may be associated with a data column. Concrete data types may conform to well-known rules or conventions that may be tested to determine if data represents a given concrete data type.

As used herein the term "functional data type" refers to a data type that represents how a concrete data typed column may be used or reasoned about. In some cases, different columns each having a concrete data type of integer may be designed for different types of usage. Accordingly, these different columns may be associated with different functional data types that represent how the data may be used. For example, functional data types consistent with the concrete data type integer may include identifiers, categories, timestamps, amounts, or the like.

As used herein, the term, "configuration information" refers to information that may include rule based policies, pattern matching, scripts (e.g., computer readable instructions), or the like, that may be provided from various sources, including, configuration files, databases, user input, built-in defaults, or the like, or combination thereof. In some cases, configuration information may include or reference information stored in other systems or services, such as, configuration management databases, Lightweight Directory Access Protocol (LDAP) servers, name services, public key infrastructure services, or the like.

The following briefly describes embodiments of these innovations to provide a basic understanding of some aspects of these innovations. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing machine learning models. In one or more of the various embodiments, a plurality of domain items may be determined based on domain data and associated schema information.

In one or more of the various embodiments, one or more labels that correspond to a predicted outcome may be generated based on the domain data such that each label may be associated with one or more code blocks and such that execution of each code block may select a portion of the plurality of domain items having an association with the predicted outcome.

In one or more of the various embodiments, a model may be trained based on a portion of a plurality of feature records and the one or more labels such that each feature record may be associated with an observance of a domain item.

In one or more of the various embodiments, the trained model may be disqualified based on one or more evaluation metrics that may be below a threshold value such that the disqualification may cause further actions, including: submitting one or more other portions of the plurality of feature records to the disqualified model such that the one or more other portions of feature records exclude the portion of feature records used to train the model; determining one or more erroneous feature fields in the plurality of feature records based on one or more metrics associated with the submission of the one or more other portions of the plurality of feature records; updating the plurality of feature records to exclude the one or more erroneous feature fields; retraining the disqualified model based on the plurality of updated feature records; or the like.

In one or more of the various embodiments, one or more entities, one or more attributes, or one or more events included in the plurality of domain items may be determined based on one or more ontologies associated with a subject matter associated with the domain data. In some embodiments, one or more of an entity, an attribute, or an event may be associated with each label based on the predicted outcome associated with each label. In some embodiments, a first portion of the code blocks may be associated with each label based on one or more entities associated with the label. In some embodiments, a second portion of the code blocks may be associated with each label based on one or more attributes associated with the label. And, in some embodiments, a third portion of the code blocks may be associated with each label based on one or more events associated with the label.

In one or more of the various embodiments, two or more tables in the domain data that are associated with one or more entities may be determined based on the schema information. In some embodiments, a portion of the plurality of feature records may be generated based on the two or more tables such that each feature record includes one or more feature fields. In some embodiments, a value for each feature field may be determined based on the two or more tables such that each feature field value may be associated with one or more row values from the two or more tables.

In one or more of the various embodiments, generating the one or more labels may include: determining a simulation date associated with the predicted outcome for each label based on the domain data such that a negative outcome may be predicted for one or more events that occur before the simulation date and such that a positive outcome is predicted for the one or more events that occur after the simulation date.

In one or more of the various embodiments, determining the one or more erroneous feature fields may include: segmenting the plurality of feature records into one or more of a training segment, a recent segment, or a simulation segment based on the one or more labels and the domain data; generating refreshed domain data that includes data collected subsequent to a collection of the data for the domain data; generating a new segment based on a plurality of other feature records that are derived from the refreshed domain data; evaluating one or more outcomes predicted by the disqualified model based on a submission of one or more feature records associated with one or more of the training segment, the recent segment, the simulation segment, or the new segment; generating the one or more metrics based on the evaluation such that the one or more metrics indicate one or more of a label leakage, time leakage, data leakage, overfitting, underfitting, drift, or the like.

In one or more of the various embodiments, generating the one or more labels may include: determining one or more events that represent one or more phenomena that may be actively chosen by one or more populations represented in the domain data; determining one or more other events that represent one or more phenomena that occur passively to the one or more populations represented in the domain data; determining one or more other events that represent one or more phenomena that are implied to occur to the one or more populations represented in the domain data such that direct observation of the one or more implied phenomena is unavailable in the domain data; or the like.

In one or more of the various embodiments, one or more time horizons associated with one or more events included in the domain data may be determined such that each time horizon is one or more of a sliding time horizon, or a triggered time horizon. In some embodiments, each label may be associated with the one or more time horizons such that the predicted outcome may be predicted to occur within the one or more time horizons.

Illustrated Operating Environment

FIG. 1 shows components of one embodiment of an environment in which embodiments of the innovations disclosed herein may be practiced. Not all of the components may be required to practice these innovations, and variations in the arrangement and type of the components may be made without departing from the spirit or scope of these innovations. As shown, system 100 of FIG. 1 includes local area networks (LANs)/wide area networks (WANs)—(network) 110, wireless network 108, client computers 102-105, application server computer 116, model generation server computer 118, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, model generation server computer 118, or other computers.

Client computers 102-105 may further be configured to include a client application that enables an end-user to log into an end-user account that may be managed by another computer, such as application server computer 116, model generation server computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Further, client computers may be arranged to enable users to provide configuration information, policy information, or the like, to model generation server computer 118. Also, client computers may be arranged to enable users to display reports, interactive user-interfaces, results provided by model generation server computer 118, or the like. Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobile communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, model generation server computer 118, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information using one or more network protocols, such Internet Protocol (IP).

Additionally, communication media typically embodies computer readable instructions, data structures, program modules, or other transport mechanisms and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

One embodiment of application server computer 116, and model generation server computer 118 are described in more detail below in conjunction with FIG. 3. Although FIG. 1 illustrates application server computer 116, or model generation server computer 118 each as a single computer, the innovations or embodiments are not so limited. For example, one or more functions of application server computer 116, or model generation server computer 118, or the like, may be distributed across one or more distinct network computers. Moreover, in one or more embodiments, model generation server computer 118 may be implemented using a plurality of network computers. Further, in one or more of the various embodiments, application server computer 116, or model generation server computer 118 may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
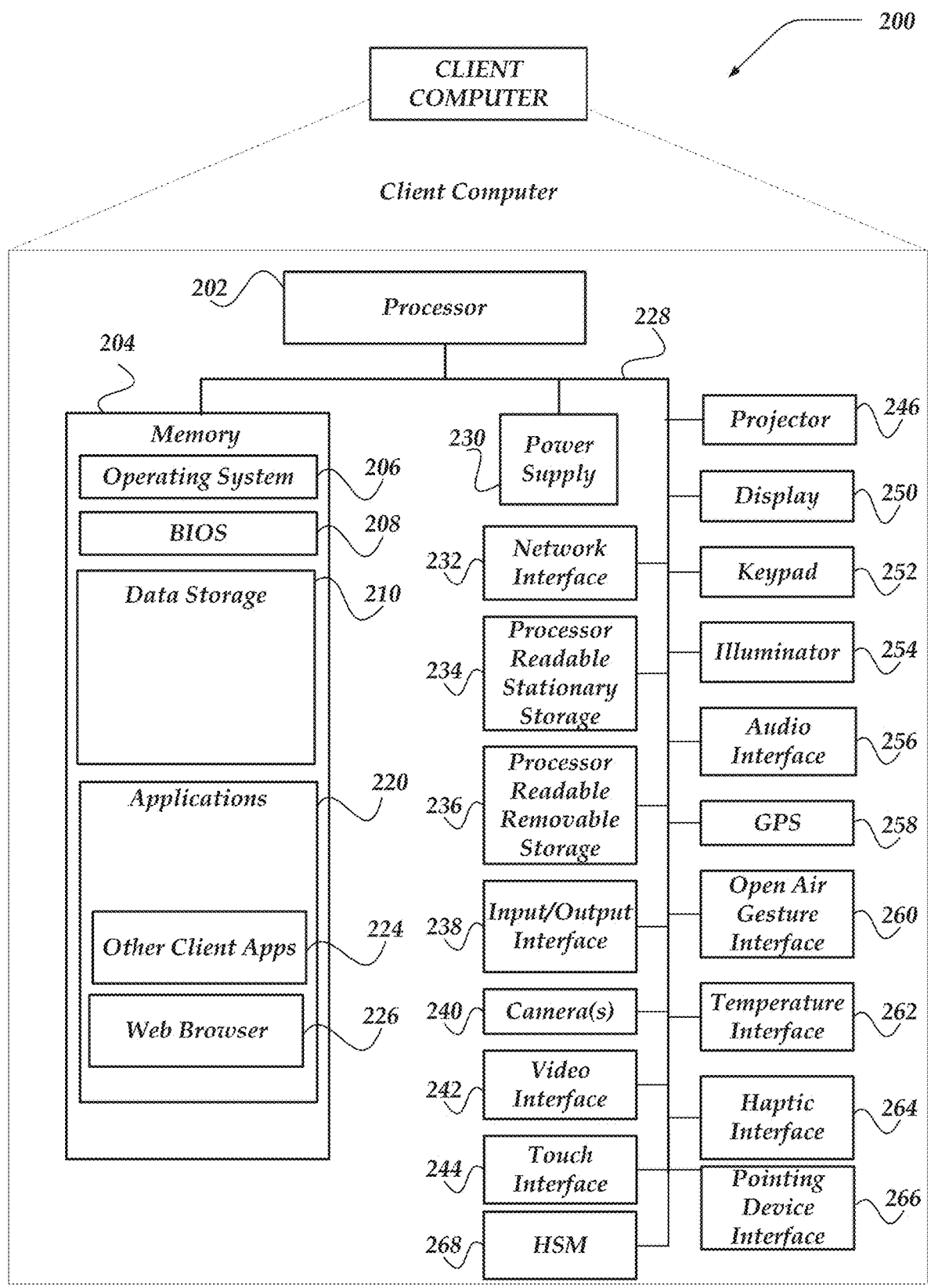
FIG. 2 illustrates a schematic embodiment of a client computer.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 for measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security modules may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth, Zigbee, or the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX®, or Linux®, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by processors, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, other client applications 224, web browser 226, or the like. Client computers may be arranged to exchange communications, such as, queries, searches, messages, notification messages, event messages, alerts, log data, API calls, or the like, combination thereof, with application servers. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware devices may directly execute embedded logic to perform actions. Also, in one or more embodiments (not shown in the figures), client computer 200 may include one or more hardware microcontrollers instead of CPUs. In one or more embodiments, the microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Network Computer

Figure 3:
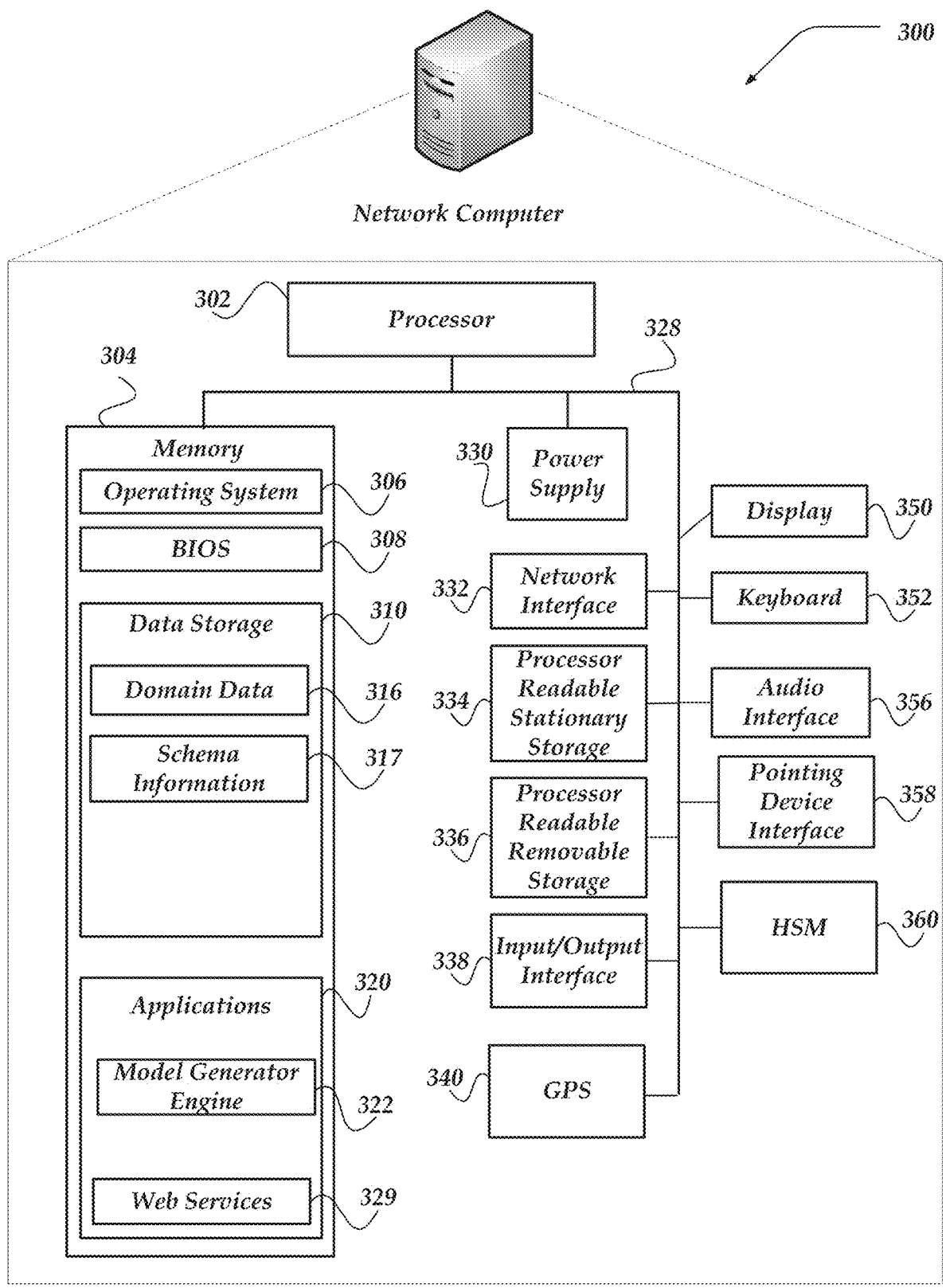
FIG. 3 illustrates a schematic embodiment of a network computer.

FIG. 3 shows one embodiment of network computer 300 that may be included in a system implementing at least one of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of application server computer 116, model generation server computer 118 shown in FIG. 1.

As shown in the figure, network computer 300 includes a processor 302 that may be in communication with a memory 304 via a bus 328. In some embodiments, processor 302 may be composed of one or more hardware processors, or one or more processor cores. In some cases, one or more of the one or more processors may be specialized processors designed to perform one or more specialized actions, such as those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Realtime Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the network computer or client computers, including for example, a Media Access Control (MAC) address, IP address, and the like.

In at least one of the various embodiments, applications, such as, operating system 306, model generator engine 322, web services 329, or the like, may be arranged to employ geo-location information to select one or more localization features, such as, time zones, languages, currencies, calendar formatting, or the like. Also, localization features may be used when interpreting network traffic, application protocols, user-interfaces, generating reports, monitoring infrastructure access in different regions, or the like. Localization may be employed by one or more internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores operating system 306 for controlling the operation of network computer 300. It will be appreciated that this component may include a general-purpose operating system such as a version of UNIX®, or Linux®, or a specialized operating system such as Microsoft Corporation's Windows® operating system, or the Apple Corporation's IOS operating system. Operating systems may include, or interface with a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, domain data 316, schema information 317, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include model generator engine 322, services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, model generator engine 322, web services 329, or the like, may be operative in a cloud-based computing environment. In one or more of the various embodiments, these applications, and others may be executing within virtual machines or virtual servers that may be managed in a cloud-based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to model generator engine 322, web services 329, or the like, may be provisioned and de-commissioned automatically.

Also, in one or more of the various embodiments, model generator engine 322, web services 329, or the like, may be located in virtual servers running in a cloud-based computing environment rather than being tied to one or more specific physical network computers. Likewise, in some embodiments, one or more of model generator engine 322, web services 329, or the like, may be configured to execute in a container-based environment.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security modules may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of CPUs. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
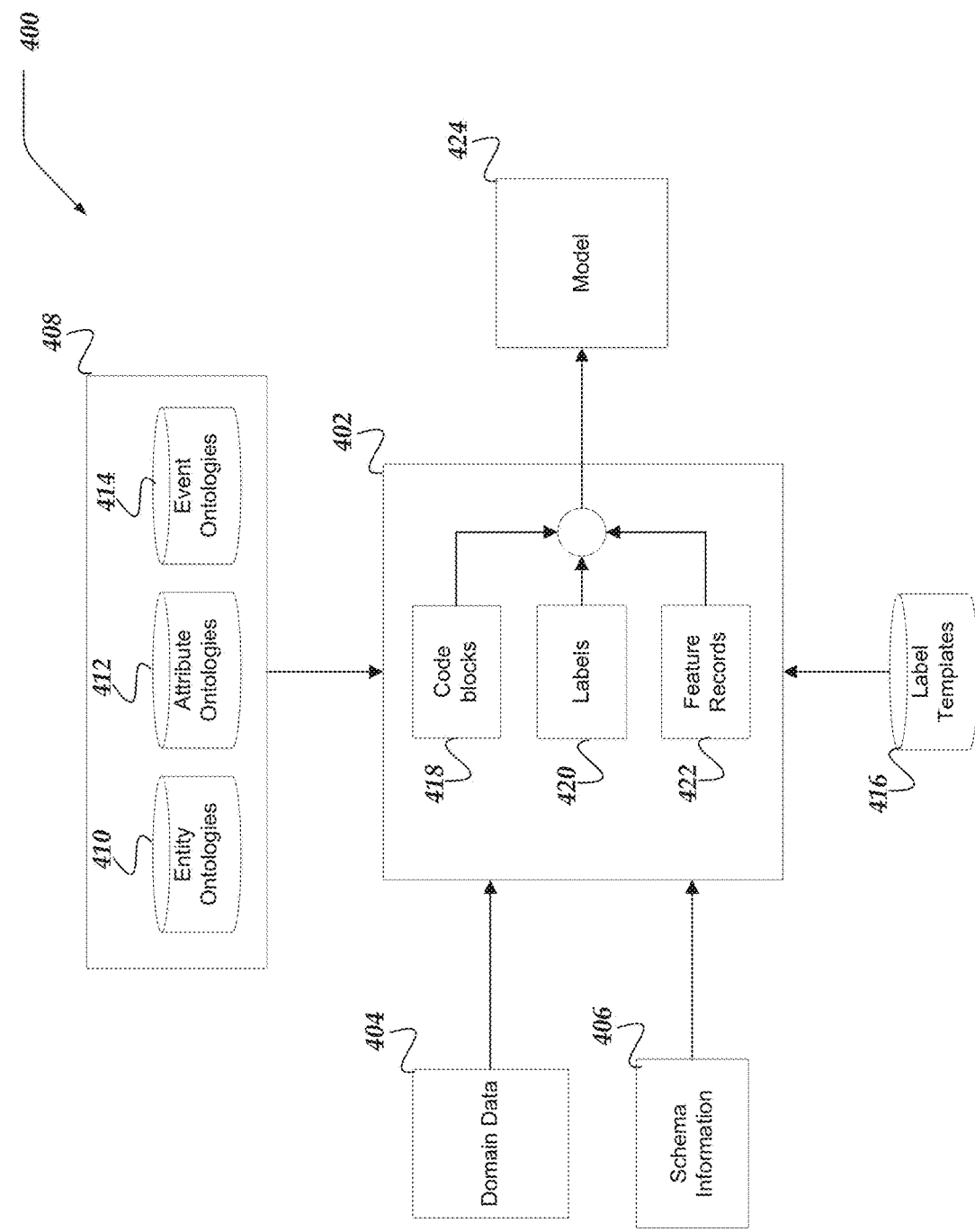
FIG. 4 illustrates a logical architecture of a system for automated data preparation, training, or tuning of machine learning models in accordance with one or more of the various embodiments.

FIG. 4 illustrates a logical architecture of system 400 for automated data preparation, training, or tuning of machine learning models in accordance with one or more of the various embodiments.

In one or more of the various embodiments, model generators (e.g., model generator engines), such as model generator 402 may be arranged to generate machine learning models, such as machine learning model 424 based on: domain data 404; schema information 406; one or more ontologies, such as ontologies 408 that may include entity ontologies 410, attribute ontologies 412, event ontologies 414, or the like; label templates 416; code blocks 418; labels 420; features 422; or the like.

In some embodiments, domain data 404 may be a data set collected from various data stores or data systems associated with a subject matter domain associated with the machine learning models being created. In some embodiments, this data may be assumed to be cleaned, formatted, imported, or the like, by one or more ETL (extract, transform, and load) processes. Detailed description of such processes may be considered beyond the scope of the innovations included herein. Accordingly, for brevity and clarity a detailed discussion of the ETL processes for generating domain data or schema information omitted. In some embodiments, domain data 404 may be provided in tables configured to be compatible with one or more databases. For example, in some embodiments, domain data may be arranged into tables that may be stored in a relational database management system (RDBMS). Also, in some embodiments, domain data may be provided to model generator 402 directly from a RDBMS or other database.

In one or more of the various embodiments, schema information 406 may include information that declares one or more tables, one or more table relationships, one or more indexes, or the like, that may correspond to the domain data. Also, in some embodiments, schema information 406 may include supplemental information such as concrete type information, functional type information, column metrics, or the like, for domain data 406. In some embodiments, concrete data Accordingly, in some embodiments, model generators may be arranged to include ontologies 408 that may include entity ontologies 410, event ontologies 412, attribute ontologies, or the like.

In some embodiments, entity ontologies, such as entity ontologies 410 may declare entity ontologies for different subject matter domains. In some embodiments, entities may be classes of population items that may be expected to be represented in domain data for a given subject matter. For example, if the subject matter domain may be information technology (IT), expected entities may include user, client computer, server computer, various applications (e.g., web server, database, domain controller, or the like), mobile computer, or the like. Similarly, for example, if the subject matter domain may be cloud computing, entities may include, computer instance, virtual machines, services, regions, containers, block storage, users, or the like.

In some embodiments, attribute ontologies, such as attribute ontologies 414 may declare attribute ontologies for different subject matter domains. In some embodiments, attributes may generally represent modifiers, state indicators, or the like, that may be associated entities. For example, restricted, disabled, unknown <IT entity), or the like.

In some embodiments, event ontologies, such as event ontologies 414 may declare event ontologies for different subject matter domains. In some embodiments, events may represent expected or common events that may occur to entities associated with a particular subject matter. For example, if the subject matter domain may be IT, events may include "<attribute, IT entity> joins a network," "<attribute, IT entity> stopped responding," "<attribute, IT entity> tried to access restricted resources," or the like.

In some embodiments, ontologies may be updated as different or additional terms-of-art, entities, or the like, may be determined for a given subject matter. Accordingly, in some embodiments, model generators may be arranged to provide one or more user interfaces that enable administrators to update existing ontologies or include new ontologies for new subject matter domains.

Accordingly, in some embodiments, model generators may be arranged to generate one or more of code blocks 418, labels 420, or features 422 for automated data preparation, training, or tuning of machine learning models. In some embodiments, code blocks may be query language expressions for generating queries for entities, entities with particular attributes, events, event and entity pairs, or the like. Generally, in some embodiments, model generators may be arranged to generate one or more code blocks for each entity, each entity/attribute set, each event/entity/attribute set, that may be determined from the ontologies, schema information, or domain data.

Also, in some embodiments, labels, such as labels 420 may represent particular outcomes that may be associated with entity observances. In some embodiments, labels may be associated with one or more code blocks that may be executed to select entity observances that correspond to a given outcome. In some embodiments, label definition rules or templates may be employed to determine which code blocks may be associated with a label. In some embodiments, labels may be used to identify observances (e.g., instances) of particular entities with particular attributes that experienced a particular event. For example, one or more code blocks may be combined to produce a query that may select observances (if any) that match a corresponding label.

Further, in some embodiments, model generators may be arranged to employ one or more label templates, such as label templates 416 to determine some or all of the code blocks that may be associated with candidate labels.

Also, in some embodiments, model generators may be arranged to generate feature records 422 based on domain data 404, schema information 406, or the like. In some embodiments, features may be records that represent entity observances as a single row of values each in a feature field. Accordingly, in some embodiments, model generators may be arranged to analyze the domain data and schema information to generate feature records that may be appropriate for generating machine learning models, such as machine learning model 424.

In some cases, for brevity or clarity, entities, attributes, or events may be referred to as domain items that may be included in the domain data or derived from the domain data.

Figure 5:
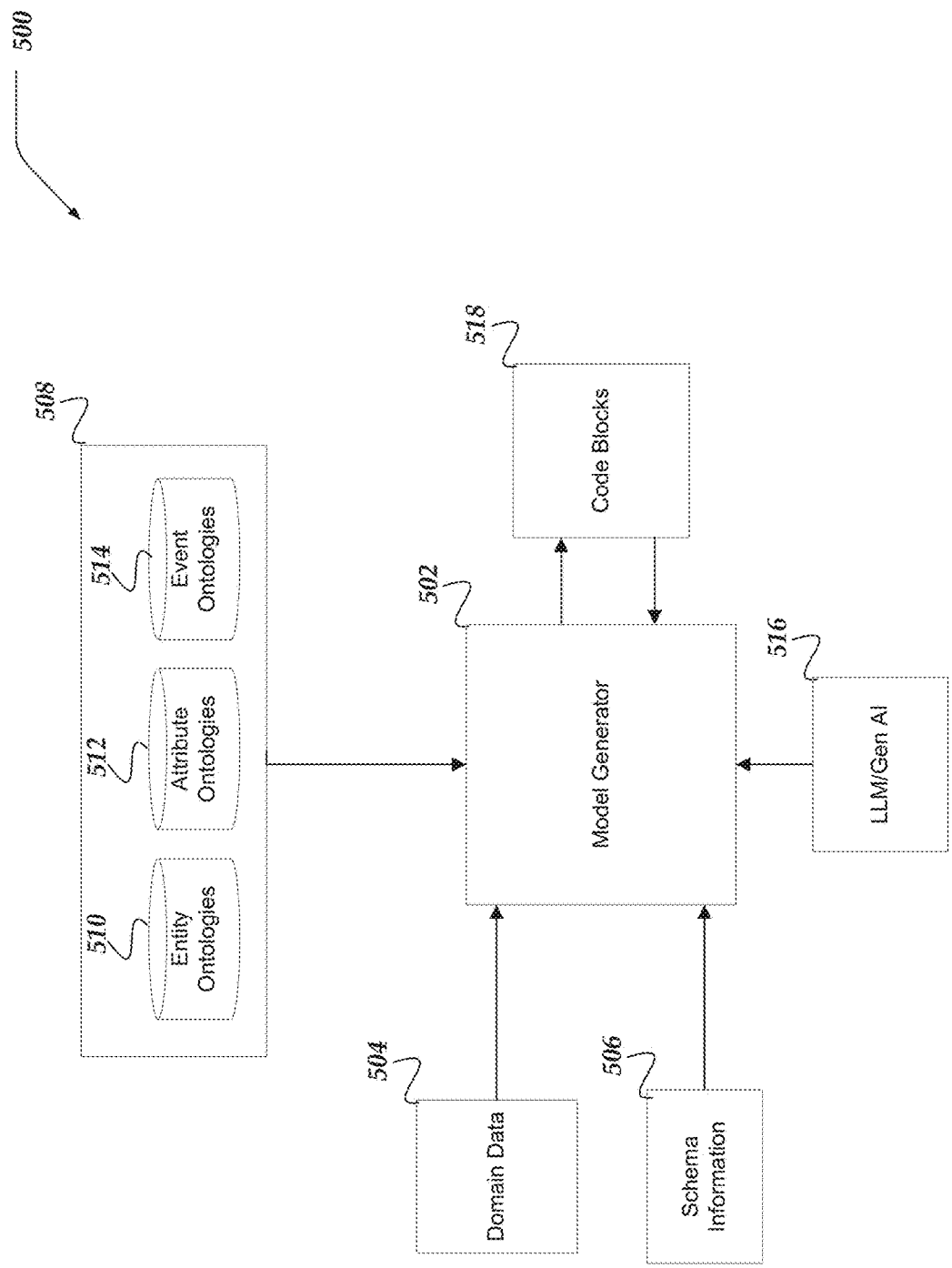
FIG. 5 illustrates a logical architecture of a system for generating code blocks for automated data preparation, training, or tuning of machine learning models in accordance with one or more of the various embodiments.

FIG. 5 illustrates a logical architecture of system 500 for generating code blocks for automated data preparation, training, or tuning of machine learning models in accordance with one or more of the various embodiments. As introduced above, in some embodiments, model generators, such as model generator 502 may be provided access to domain data, such as domain data 504. Also, in some embodiments, model generator 502 may be provided schema information 506.

In some embodiments, model generators may be arranged to generate a plurality of discrete code blocks that may be directed to entities, entity plus attributes, events, labels, or the like.

In one or more of the various embodiments, model generators may be arranged to automatically generate code blocks for each entity population, including code blocks for selecting entities with particular attributes. For example, if the subject matter may be higher learning such as a university or college, the associated domain data may include entities, such as, students, instructors, professors, courses, or the like. Further, in this example, students may have attributes such as active, absent, applied, prospective, graduated, or the like. Accordingly, for this example, model generators may generate separate code blocks for active students, graduated students, and so on.

Also, in some embodiments, model generators may be arranged to generate separate code blocks for events that may be determined from the domain data. As mentioned, event ontologies may declare one or more events that may be relevant for a given subject matter. Returning to the university example, model generators may generate code blocks that correspond to events, such as graduate, apply (to university), drop-a-course, pay-tuition, schedule-a-course, or the like. Accordingly, in some embodiments, model generators may be arranged to generate code blocks that select populations that have experienced the event. For example, in some embodiments, if the event is graduated, model generators may generate a code block that selects students that are or have graduated.

In contrast, conventional machine learning systems may rely on manually generated queries to select entity observances of interest. However, in some embodiments, this practice may disadvantageously rely on the subjectivity of users (e.g., data scientists) who are selecting which query expressions to include. Accordingly, this may lead to the omission of some query expressions on account of bias or mistake. A further disadvantage may be variability in the selection or expression of query expressions between or among different data scientists such that different data scientists working with the same domain data may create different queries that ostensibly return the same results but in fact may return different results.

Accordingly, in some embodiments, model generators may be arranged to generate code blocks for each entity, attribute, or event combination in the domain data to avoid selection bias or selection variability.

In some embodiments, model generators may be arranged to determine entities, attributes, or events based on one or more ontologies, such as ontologies 508. In some cases, in some embodiments, ontologies 508 may include entity ontologies 510, attribute ontologies 512, or event ontologies 514, or the like.

In some embodiments, model generators may be arranged to submit entities, attributes, or events to one or more generative AI models to generate some or all code blocks. Accordingly, in some embodiments, model generators may be arranged to provide one or more user interfaces that may enable users to interactively work with an LLM, such as LLM 516. In some embodiments, model generators may display code blocks recommended by LLM 516 to users that may approve/accept the code blocks. Also, in some embodiments, users may be enabled to edit code blocks or submit de novo code blocks.

For example, if domain data includes an entity, such as student, model generators may be arranged to automatically generate code blocks for queries for selecting "active student," "prospective student," "former student," "graduated student," or the like, from domain data.

Similarly, for example, in some embodiments, code blocks may be generated for associating entities with events. Or, in some embodiments, determining which events may be associated with particular attribute entity combinations. For example, in some embodiments, a student may be considered an active student during the time period between events such as starting a course and ending a course.

Also, in some embodiments, code blocks may be employed to create labels that define which observances in the domain data should be assigned a label that may be used to train machine learning models to predict answers to questions about the domain data or predicting outcomes.

Figure 6:
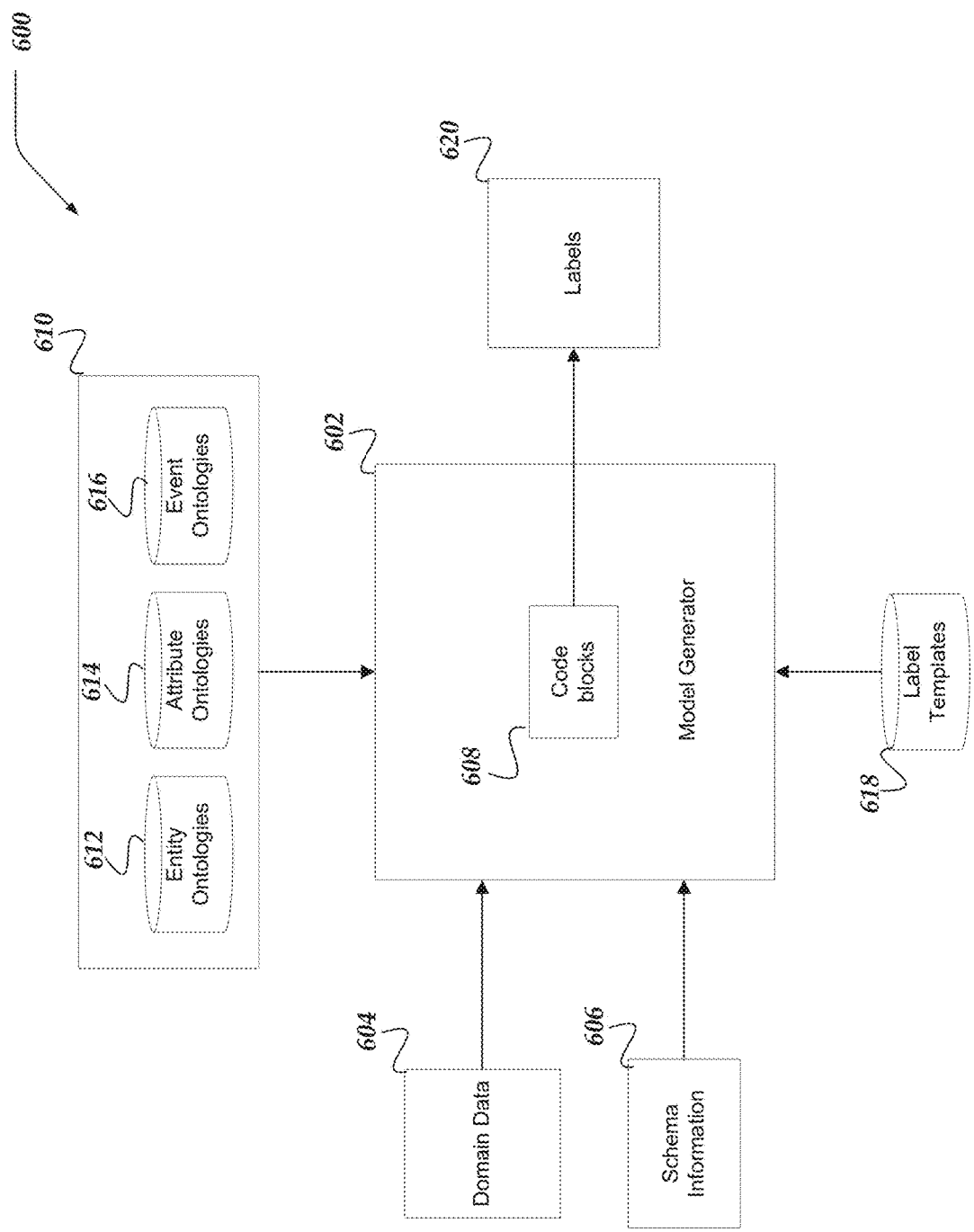
FIG. 6 illustrates a logical architecture of a system for generating labels for automated data preparation, training, or tuning of machine learning models in accordance with one or more of the various embodiments.

FIG. 6 illustrates a logical architecture of system 600 for generating labels for automated data preparation, training, or tuning of machine learning models in accordance with one or more of the various embodiments. As introduced above, in some embodiments, model generators, such as model generator 602 may be provided access to domain data, such as domain data 604. Also, in some embodiments, model generator 502 may be provided schema information 606. Further, in some embodiments, model generators may be arranged to generate one or more code blocks, such as code blocks 608.

Accordingly, in some embodiments, model generators may be arranged to employ ontologies 610 (which may include one or more of entity ontologies 612, attribute ontologies 614, event ontologies 616, or the like), code blocks 608, or label templates 618 to generate one or more labels, such as labels 620.

In some embodiments, labels may be the phenomena (event or attribute) that a machine learning model may be trying to predict from among a given population. In some embodiments, labels may be categorized into at least four categories, including: Active, Explicit Events; Passive, Explicit Events, Implicit Events, or Attributes.

In some embodiments, labels categorized as "Active, Explicit" may be considered a phenomenon that may be actively chosen by (or on behalf of) a member of the population, and may be observed via a data point as having occurred. For example, purchasing, watching a video, or subscribing.

In some embodiments, labels categorized as "Passive, Explicit" may be considered a phenomenon that may passively occur to the population of interest and may be observed via a data point as having occurred. For example, for some embodiments, a subscription being purchased on auto-renew may be considered a "Passive, Explicit" label.

In some embodiments, labels categorized as "Implicit" may be considered a phenomenon, whether actively or passively occurring, that may not be observed via a datapoint as having occurred. In this case, the phenomenon may be inferred. For example, attriting (e.g., ceasing to buy from a service provider, ceasing to watch videos, or the like) cannot be directly observed, but may be instead inferred via a lack of active or passive explicit phenomenon (e.g., lack of purchases, lack of watching videos, or the like).

Also, in some embodiments, attributes may be considered qualities that observations (entity instances) in the population have. For example, demographics or affinities.

Accordingly, in some embodiments, model generators may be arranged to associate one or more code blocks with each label. In some embodiments, executing the code blocks may select observations from the domain data that match the label.

In some embodiments, model generators may be arranged to suggest or recommend labels, including associating code blocks. In some embodiments, model generators may be arranged to employ specialized LLM prompts to enable LLMs to emit one or more recommended label or label code block associations. Accordingly, in some embodiments, model generators may be arranged to provide one or more user interfaces that enable users to evaluate the recommended labels or label code block association to determine if they may be suitable for automated data preparation, training, or tuning of machine learning models.

Figure 7:
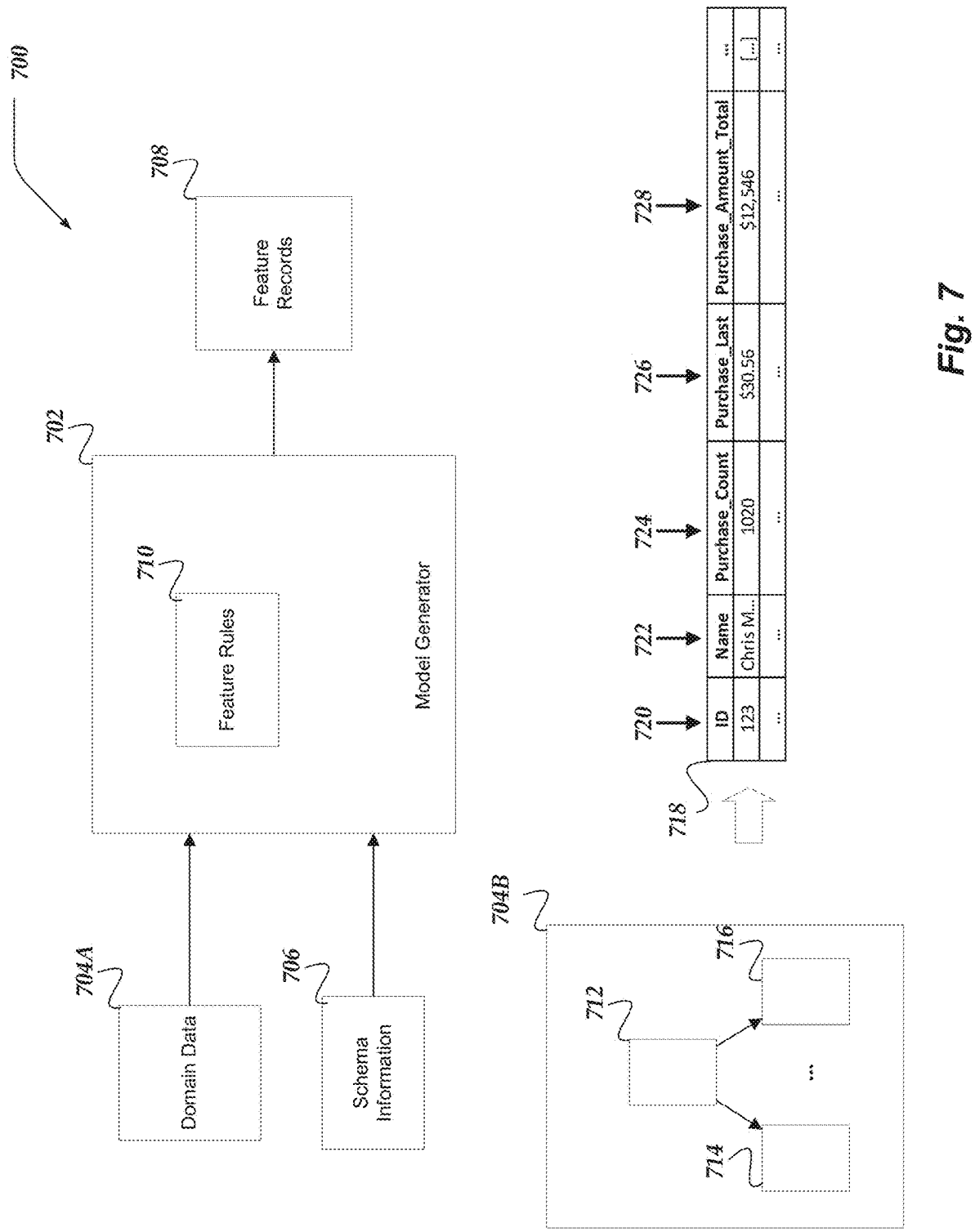
FIG. 7 illustrates a logical architecture of a system for generating labels for automated data preparation, training, or tuning of machine learning models in accordance with one or more of the various embodiments.

FIG. 7 illustrates a logical architecture of system 700 for generating labels for automated data preparation, training, or tuning of machine learning models in accordance with one or more of the various embodiments. In most cases, machine learning models may be configured to accept vectors that include feature records for training or prediction. Accordingly, in some embodiments, model generators, such as model generator 702 may be arranged to employ domain data, such as domain data 704A along with schema information, such as schema information 706 to generate a plurality of feature records, such as feature records 708. In some embodiments, feature records may be considered to be a set of vectors or rows where each element of the vector row may be considered an individual feature of an entity with particular feature values for each observance of an entity.

In some embodiments, domain data 704A may be based on several tables and one or more relationships between or among the tables. Conventionally, users may employ join expressions or transformation expressions that join data from related tables into the same result set. In conventional solutions, data scientists may manually write the join expressions or transformation expressions that include data from more than one table into a single result set that may be formatted into a vector for machine learning. In some cases, manual joins may be disadvantageous for one or more reasons, including subjectivity/bias in selecting which tables or fields to join. Also, in some embodiments, selecting how data may be aggravated or otherwise represented in a vector may be subject to user subjectivity or bias. Further, in some embodiments, the number of fields or relationships to consider may be overwhelming such that users may selectively include features into vectors while omitting others. Accordingly, in some embodiments, different users may select different features for the same entities, introducing disadvantageous variability in model development.

Accordingly, in some embodiments, model generators may be arranged to automatically generate feature records based on a plurality of feature rules, such as feature rules 710. In some embodiments, feature rules may explicitly declare how particular columns in the domain data may be represented in a feature record. In some embodiments, model generators may be arranged to employ schema information that includes one or more of a discrete data type or functional data type for each column in the domain data. Note, one of ordinary skill in the art will appreciate that schema information that includes functional data types may be generated prior to providing the domain data to the model generator. Accordingly, for brevity and clarity a detailed description of how schema information may be generated is omitted here. However, one of ordinary skill in the art will appreciate that one or more systems or users may generate or augment schema information to include per column functional data types. Also, in some embodiments, schema information may include one or more metrics associated with data in each column, such as mode, standard deviation, cardinality, number of rows, or the like, before the domain data and schema information may be provided to model generators.

Further, in some embodiments, operators or administrators may discover by observation or experimentation additional feature rules or advantageous modifications to feature rules. Accordingly, in some embodiments, model generators may be arranged to determine which feature rules to apply based on configuration information to account for local requirements or local circumstances.

In some embodiments, domain data 704B may be considered to represent the same data as domain data 704A. In this example, domain data 704B includes one or more tables, such as table 712, table 714, table 716, or the like. In this example, for some embodiments, it may be assumed that table 712 be a base customer table with table 714 and table 716 storing data related to customers, such as purchases, or the like. Accordingly, in some embodiments, feature record 718 may represent a feature record that may be generated from domain data 704B. In this example, for some embodiments, feature field 720 (ID) and feature field 722 (name) may be considered to be populated by one-to-one transfers from the domain data. In contrast, in this example, feature field 722, feature field 724, feature field 728, and feature field 728 may be generated by a feature rule to represent one or more characteristics associated with the customer's purchase history. Accordingly, in this example, it may be assumed that domain data 704B may include a table that stores the purchase history for customers such that it may have one row for each purchase. For example, a purchase table (not shown in the figure) may include various columns for storing values such as customer ID, purchase, purchase date, purchase type, and so on. Accordingly, in some embodiments, a feature rule may include instructions for analyzing the rows or columns in the purchase table to map them to one or more feature fields. Accordingly, in this example: feature field 724 may represent the total purchases for the customer; feature field 726 may represent the amount paid for the customer's most recent purchase; feature field 728 may represent the lifetime purchase amount for the customer; or the like. Note, one of ordinary skill in the art will appreciate the number of feature fields, transfer rules for domain data to feature fields, order of feature fields in a feature record, or the like, may vary without departing from the scope of the innovations disclosed herein. Further, in some embodiments, while for brevity a single feature record is shown, in practice there may be a feature record for each qualifying entity observance that may be determined from the domain data. Accordingly, in this example, if there were 100,000 customers in the domain data, a model generator may be arranged to generate 100,000 feature records for customers based on the customers included in the domain data.

Figure 8:
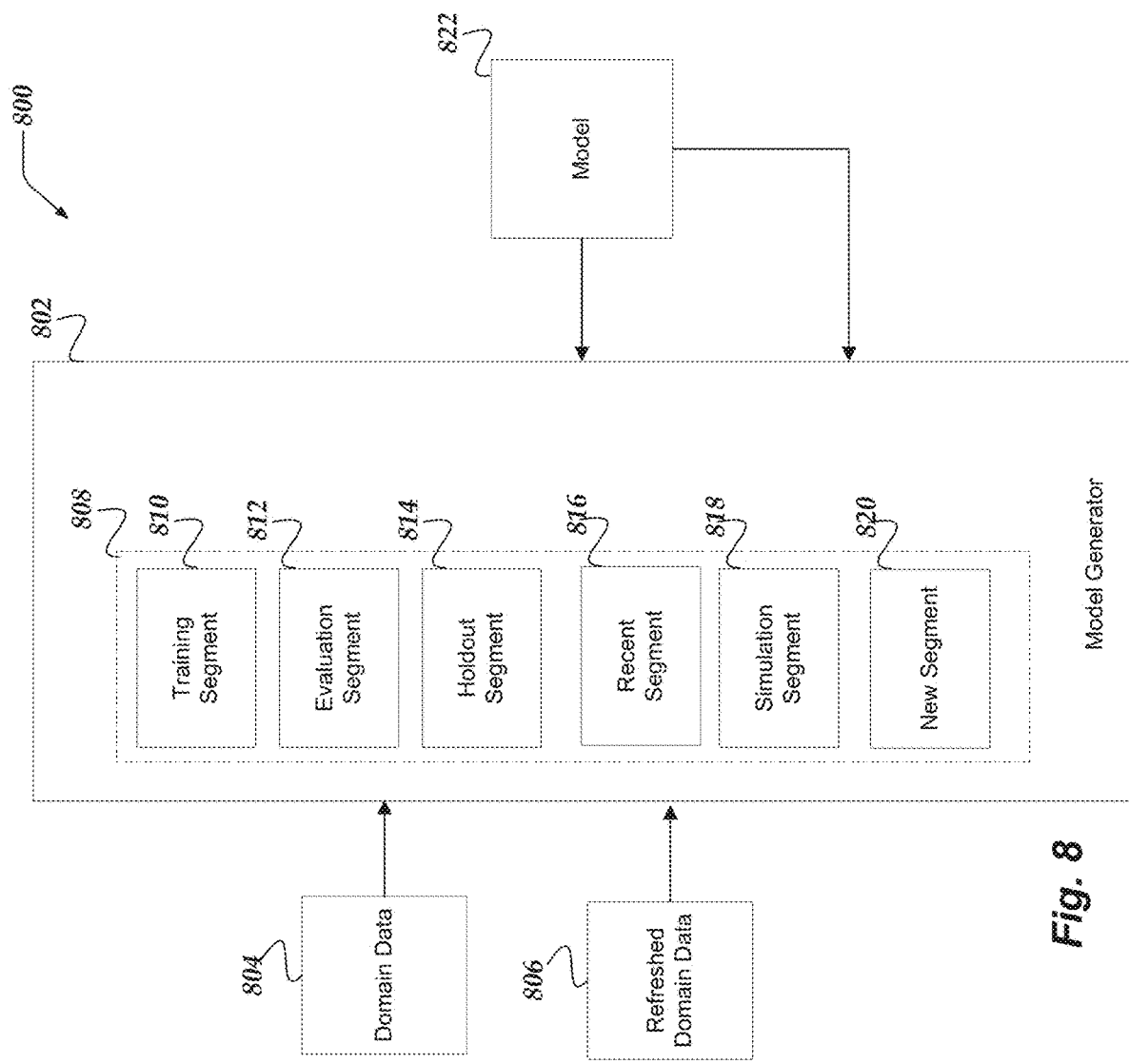
FIG. 8 illustrates a logical schematic of a system for automated data preparation, training, or tuning of machine learning models in accordance with one or more of the various embodiments.

FIG. 8 illustrates a logical schematic of system 800 for automated data preparation, training, or tuning of machine learning models in accordance with one or more of the various embodiments.

In some embodiments, model generators, such as model generator 802 may be arranged to train or evaluate machine learning models. Accordingly, in some embodiments, model generators may be arranged to generate data segments based on feature records generated from domain data. Accordingly, in this example, model generators may be arranged to divide feature records 808 into different segments that may be used for training, evaluation, or testing or machine learning models, such as machine learning model 822.

Accordingly, in some embodiments, model generators may be arranged to generate feature records 808 based on domain data 804. In some embodiments, as mentioned above, individual feature records may correspond to entity observations determined from the domain data. Accordingly, in some embodiments, model generators may be arranged to segment feature records 808 into a training segment, such as training segment 810, an evaluation segment, such as evaluation segment 812, a holdout segment, such as holdout segment 814, a recent segment, such as recent segment 816, a simulation segment, such as simulation segment 818, a new segment, such as new segment 820, or the like.

In some embodiments, as mentioned above, domain data 804 may be considered subject matter data that may be preserved at a particular point in time. Accordingly, in some embodiments, domain data 804 provides a snapshot of the subject matter data. In some embodiments, model generators may be arranged to generate feature records from the domain data and segment those feature records into training segments, evaluation segments, holdout segments, recent segments, simulation segments, or the like. Further, in some embodiments, model generators may be arranged to obtain new or refreshed domain data, such as refreshed domain data 806 that may include data for that may have occurred some time after the original domain data snapshot was created. Accordingly, in some embodiments, new segments, such as, new segment 820 may be based on refreshed domain data.

In some embodiments, training segment 810 may include feature records based on the original domain data snapshot. Accordingly, in some embodiments, training segments may be employed to initially train the machine learning model.

In some embodiments, evaluation segment 812 may be based on the original domain data snapshot. In some embodiments, model generators may be arranged to employ evaluation segments to evaluate the fitting progress as the machine learning model is trained. In some contexts, data included in evaluation segments may be referred to as validation data.

In some embodiments, holdout segment 814 may be generated based on the original domain data. In some embodiments, holdout segments may be a segment of the feature records which a human user may employ to confirm/validate machine learning model performance. In some embodiments, records included in holdout segments may be excluded from training related activities such that those records may be considered unknown or unseen to the machine learning model until they may be used to test the performance of the machine learning model. In some embodiments, holdout segments may be employed to determine how well the machine learning model performs on average with data it has not been exposed to. In some cases, holdout segments may be referred to as test data.

In some embodiments, recent segment 816 may be based on the original domain data snapshot. In some embodiments, feature records included in recent segment 816 may be selected to provide a cross-section of the training data, evaluation data, and holdout data that includes the most recent month or months that may be associated with a label. Accordingly, in some embodiments, recent data may be employed to determine if the performance of a machine learning model may change over time.

In some embodiments, simulation segment 818 may be based on a combination of the feature records based on domain data 804 and other feature records based on refreshed domain data 806. In some embodiments, the portion of feature records provided by the original domain data may be used to provide features and the data from the refreshed domain data may be employed to provide labels.

Accordingly, in some embodiments, simulation segment 818 may be considered to represent observations which existed in the domain data at the time of the original snapshot but were not associated with an outcome label during the time-window used for training the machine learning model. For example, unconverted sales leads may exist in the domain data that have not yet successfully been resolved into a sale or removed from consideration for a sale. Thus, in some embodiments, because these observations included in the simulation segment had not resolved or matured to match one or more labels, the machine learning model would not have had access to those feature records or labels for the observations during training. Note, in some embodiments, the observations represented by feature records in the simulation segment would not match labels because the necessary events would not be represented in the original domain data snapshot.

In some embodiments, the outcomes (e.g., label matches) for observations included in simulation segments may be obtained if time has passed since they were collected (e.g., time of domain data snapshot) and the time refreshed domain data was collected. In some embodiments, the simulation segment may include feature records based on the original domain data dataset and the labels should be generated from the refreshed data dataset. Accordingly, in some embodiments, feature values for observations included in the simulation segment should not be updated with data from the refreshed domain data. In some embodiments, model generators may be arranged to employ simulation segments to evaluate how well a machine learning model performs if the outcomes have not yet been determined. Also, in some embodiments, simulation segments may enable a close analog to the data environment which may be encountered in a production environment using live data.

In some embodiments, a new segment, such as new segment 820 may include feature records generated from refreshed domain data 806. In some embodiments, new segments may include observations which did not exist in the original domain data snapshot. In some embodiments, observations included in new data segments may be observations that were created and resolved in the time-window associated with the refreshed domain data. Accordingly, in some embodiments, features for such observations may be derived from the refreshed domain data and outcomes (labeling) may be determined based on the refreshed domain data. In some cases, for some embodiments, the refreshed domain data may not include qualifying observations. Accordingly, in some embodiments, model generators may be arranged to exclude new data segments from consideration.

In one or more of the various embodiments, model generators may be arranged to employ the different segments of feature record to train, evaluate, or test machine learning models, such as 822.

Figure 9:
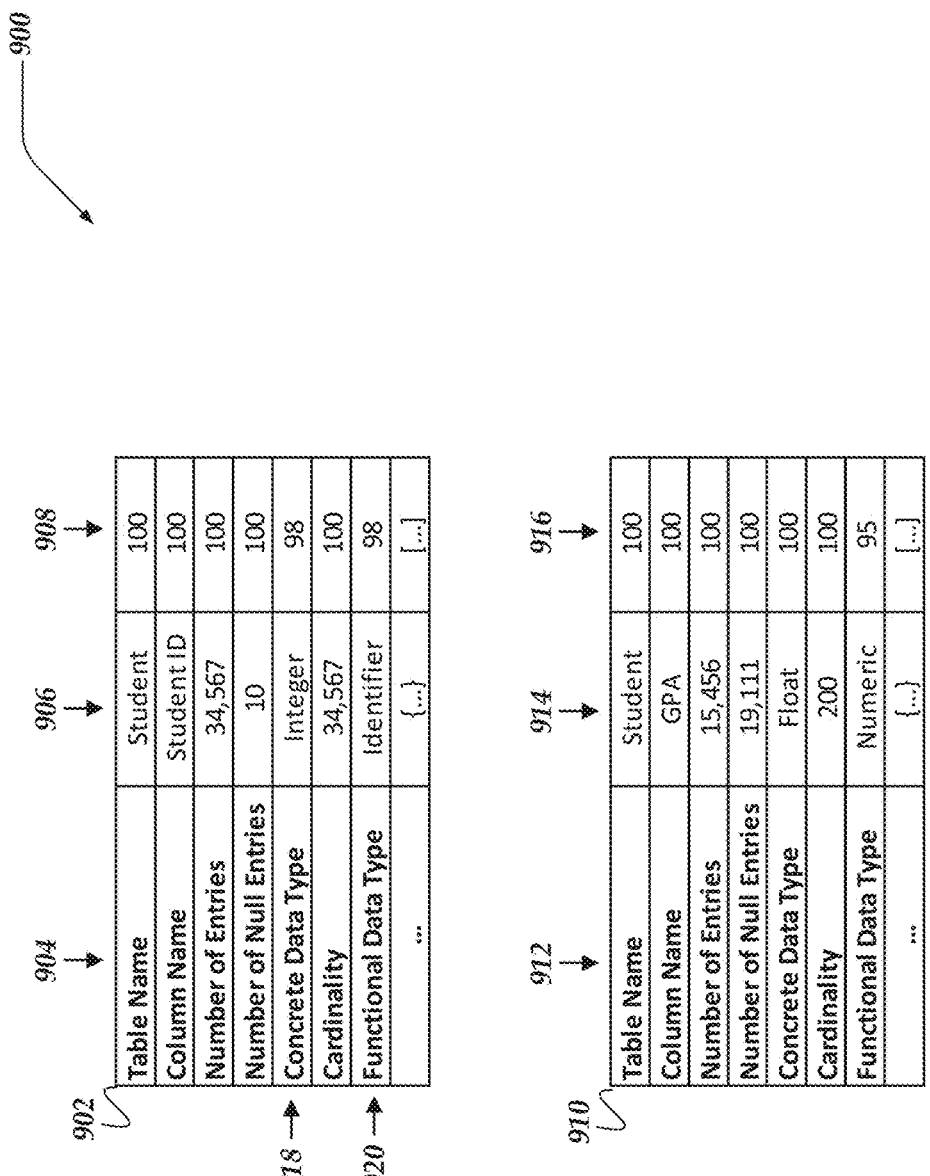
FIG. 9 illustrates a logical representation of schema information for automated data preparation, training, or tuning of machine learning models in accordance with one or more of the various embodiments.

FIG. 9 illustrates a logical representation of schema information 900 for automated data preparation, training, or tuning of machine learning models in accordance with one or more of the various embodiments.

In some embodiments, profile 902 and profile 910 may represent portions of schema information for columns that may be part of tables included in domain data.

As described above, in some embodiments, model generators may be provided schema information that includes information about the tables or columns included in domain data. In some embodiments, schema information may include table profiles or column profiles that include information about particular columns or tables included in domain data. In some embodiments, table profiles may be considered data structures that include information about a table and its columns and column profiles may be considered data structures that include information about columns or tables. Herein table profiles or column profiles may be considered synonyms in the sense that the information for evaluating columns (column profiles) may be used for evaluating both columns and tables and table profiles may be used for evaluating both tables and columns. Accordingly, unless explicitly stated or otherwise clear from the context, table profiles or column profiles may be assumed to be similar in usage or behavior within systems for automated data preparation, training, or tuning of machine learning models.

In some embodiments, column profiles, such as, column profile 902 may include information about various table properties or various column properties. Also, in some embodiments, column profiles may include metrics, statistics, or the like, that may have been generated by analysis engines (not shown) during analysis or ingestion of raw data to create the domain data. Accordingly, in this example, for some embodiments, column profile 902 includes: column 904 for storing profile property labels; column 906 for storing a value for a given property; column 908 for storing confidence scores that may indicate the veracity of a given property value. In this example, column profile 902 may include properties or metrics for a column labeled Student ID in a table labeled Student.

Likewise, in this example, for some embodiments, column profile 910 includes: column 912 for storing property labels; column 914 for storing a value for a given property; column 916 for storing confidence scores that may indicate the veracity of a given property value. In this example, column profile 910 may include properties or metrics for a column labeled GPA in a table labeled Student.

Also, for some embodiments, profile fields, such as: profile field 918 may store the concrete data type (e.g., Integer) of a column; profile field 920 may store the functional data type of a column; or the like. In some embodiments, other fields may store other properties, such as, number of entries, number of null entries, cardinality, or the like, that may be computed, predicted, or inferred by a system (not shown) that provides the domain data to the model generators.

Generalized Operations

FIGS. 10-17 represent generalized operations for automated data preparation, training, or tuning of machine learning models in accordance with one or more of the various embodiments. In one or more of the various embodiments, processes 1000, 1100, 1200, 1300, 1400, 1500, 1600, or 1700 described in conjunction with FIGS. 10-17 may be implemented by or executed by one or more processors on a single network computer such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based or containerized environments. However, embodiments are not so limited and various combinations of network computers, client computers, or the like may be utilized. Further, in one or more of the various embodiments, the processes described in conjunction with FIGS. 10-17 may be used for automated data preparation, training, or tuning of machine learning models in accordance with at least one of the various embodiments or architectures such as those described in conjunction with FIGS. 1-9. Further, in one or more of the various embodiments, some or all of the actions performed by processes 1000, 1100, 1200, 1300, 1400, 1500, 1600, or 1700 may be executed in part by model generator engine 322 (e.g., model generators), or the like, running on one or more processors of one or more network computers.

Figure 10:
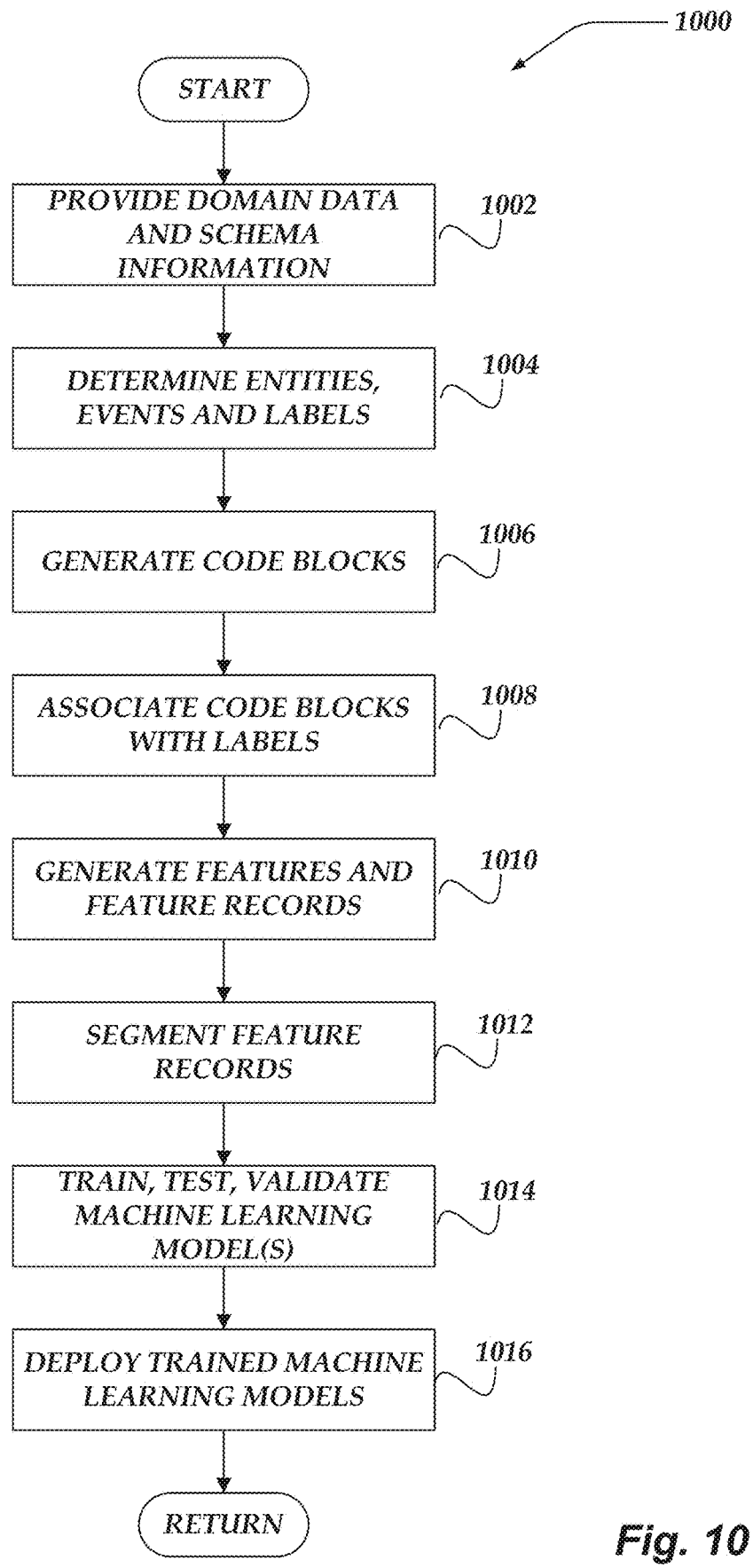
FIG. 10 illustrates an overview flowchart of a process for automated data preparation, training, or tuning of machine learning models in accordance with one or more of the various embodiments.

FIG. 10 illustrates an overview flowchart of process 1000 for automated data preparation, training, or tuning of machine learning models in accordance with one or more of the various embodiments. After a start block, at block 1002, in one or more of the various embodiments, domain data and schema information may be provided to a model generator. In some embodiments, domain data may be collected or processed by one or more systems that may be external to model generators. Also, in some cases, model generators may include data analysis systems that enable raw data from various sources to be processed into domain data. Likewise, in some embodiments, similar systems may generate schema information for the domain data. Herein, for clarity domain data and schema information may be described as separate data collections. However, in some cases, schema information (e.g., column profiles, table profiles, or the like) may be embedded or otherwise included domain data.

In one or more of the various embodiments, domain data may represent a snapshot in time of an organization's data. In some cases, for some embodiments, one or more training or validation operations may depend on refreshed domain data that includes newer data than what may have been included in the original domain data snapshot. Accordingly, in some embodiments, such newer domain data may be referred to as refreshed domain data.

At block 1004, in one or more of the various embodiments, model generators may be arranged to determine one or more entities, one or more attributes, or one or more events based on the domain data and the schema information. In some embodiments, different subject matter domains (e.g., education, healthcare, retail/commerce, manufacturing, or the like) may be associated with one or more entities, one or more attributes, or one or more events that may be considered common to a given subject matter domain. In some cases, in some embodiments, entities, attributes, or events may have the same label/name across different subject matter domains. In some embodiments, the same named entity, attribute, or event may have different meanings across different subject matter domains.

Accordingly, in some embodiments, model generators may be arranged to employ one or more ontologies directed to a given subject matter domain. In some embodiments, model generators may be provided one or more entity ontologies, one or more attribute ontologies, or one or more event ontologies that may be employed to associate or identify subject matter definitions, label templates, events, event types, code block templates, other subject matter related rules, or the like, with names or labels that may be included in domain data or schema information.

At block 1006, in one or more of the various embodiments, model generators may be arranged to generate one or more code blocks. In some embodiments, code blocks may be query expressions that may be applied to retrieve particular observances of entities, attributes (e.g., entities observances having a particular attribute), or events. For example, in some embodiments, if domain data includes an entity such as students, code blocks may be generated to select an individual student, all students, prospective students, active students, past students, graduated students, inactive students, or the like. Similarly, in some embodiments, code blocks may be generated for events.

At block 1008, in one or more of the various embodiments, model generators may be arranged to associate one or more code blocks with one or more labels. In some embodiments, labels may be used to identify which entity observances may correspond to a given outcome or classification that a machine learning model may be designed to predict or infer. Accordingly, in some embodiments, labels may be associated with one or more code blocks that, if executed, will select observances from the domain data that meet the requirements of a given label.

At block 1010, in one or more of the various embodiments, model generators may be arranged to generate one or more feature records. In some cases, for some embodiments, machine learning models may be designed to accept inputs in a particular format. In some cases, the format of domain data may not be directly compatible with machine learning models or machine learning training processes. Accordingly, in some embodiments, model generators may be arranged to generate feature records that conform to format requirements of a given machine learning model or machine learning training process. For example, in some embodiments, machine learning training may require inputs to be provided as rows or vectors of values. Accordingly, in some embodiments, feature records may be single rows that include multiple feature fields, each including a single value. Thus, in some embodiments, model generators may be arranged to employ schema information to analyze domain data to generate feature records suitable for machine learning.

At block 1012, in one or more of the various embodiments, model generators may be arranged to segment the feature records. In some embodiments, feature records may be organized into different segments such that different segments of feature records may be used for different stages or phases for training, testing, or validating machine learning models. In some embodiments, feature record segments may include training segments, evaluation segments, holdout segments, recent segments, simulation segments, or new segments.

At block 1014, in one or more of the various embodiments, model generators may be arranged to train, test, or validate one or more machine learning models. In one or more of the various embodiments, model generators may be arranged to employ feature records and labels to automatically train machine learning models. In some embodiments, model generators may be arranged to generate a unique machine learning model for one or more labels. For example, a first model may be trained to predict which students will graduate or a second model may be trained to predict if a prospective student may mature into an active student, or the like.

In some embodiments, model generators may be arranged to train machine learning models using a training segment of the feature records.

At block 1016, in one or more of the various embodiments, model generators may be arranged to deploy to one or more validated machine learning models. In some embodiments, model generators may be arranged to employ feature record segments other than the training segment to test or validate trained machine learning models. In some embodiments, if errors may be detected, model generators may employ one or more particular segments of the feature records to classify the error or determine one or more mitigation actions that may reduce the impact or the error or remove it from the machine learning model. In some embodiments, the type of machine learning model errors that may be determined or mitigated may include label leakage, time leakage, data leakage, overfitting, underfitting, drift, or the like.

Next, in one or more of the various embodiments, control may be returned to a calling process.

Figure 11:
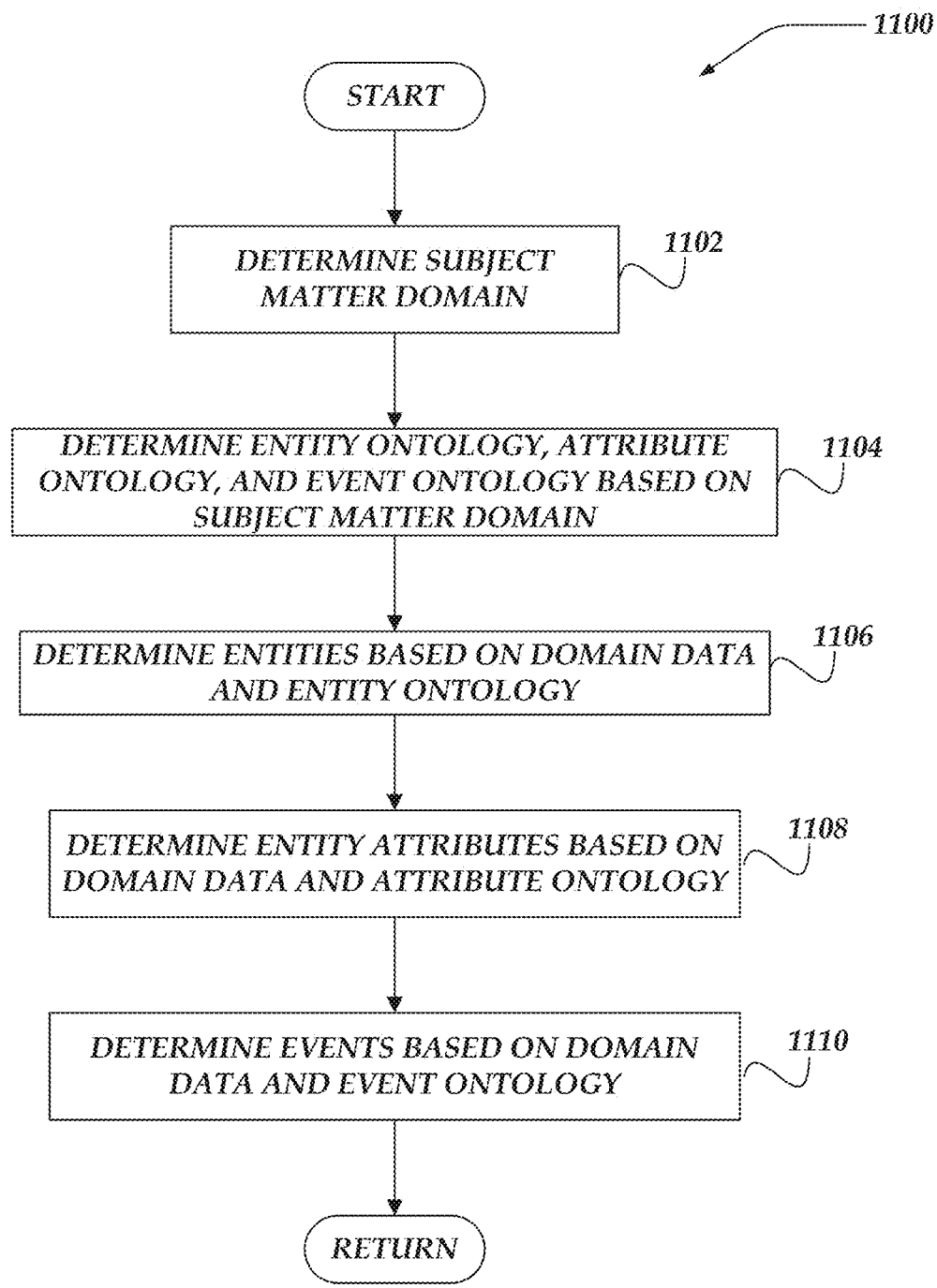
FIG. 11 illustrates a flowchart of a process for automated data preparation, training, or tuning of machine learning models in accordance with one or more of the various embodiments.

FIG. 11 illustrates a flowchart of process 1100 for automated data preparation, training, or tuning of machine learning models in accordance with one or more of the various embodiments. After a start block, at block 1102, in one or more of the various embodiments, a subject matter domain may be determined. In some embodiments, model generators may be arranged to provide one or more user interfaces that enable users to select a subject matter domain. Also, in some embodiments, model generators may be arranged to determine the subject matter domain based on configuration information. In some embodiments, additional subject matter domains may be provided as they may be discovered or encountered. Further, in some embodiments, existing subject matter may be refined into more precise determinations. For example, an initial deployment of model generators may include a subject matter domain such as education, which may be refined into more domains such as higher education, primary education, vocational education, professional education, or the like. Accordingly, in some embodiments, model generators may be arranged to employ configuration information to determine which subject matter domains may be available.

At block 1104, in one or more of the various embodiments, model generators may be arranged to determine an entity ontology, attribute ontology, event ontology, or the like, based on the subject matter domain. As mentioned herein, model generators may be arranged to employ subject matter ontologies for determining entities, attributes, or events.

At block 1106, in one or more of the various embodiments, model generators may be arranged to determine one or more entities based on the domain data and entity ontology. In some embodiments, different subject matter domains may be associated with different entities. In some cases, entities named the same may refer to different concepts across different subject matter domains. For example, a visitor entity may have different meaning if the subject matter domain may be bricks-and-mortar retail, online content, hospitality, services, or the like.

Also, in some embodiments, entity ontologies may include alternate names for the same entity. Accordingly, in some embodiments, model generators may be arranged to map names/labels in the domain data to entities in the entity ontology for a subject matter domain. However, generally, the domain data and schema information may be considered to be normalized to a known set of entity names based on similar or the same ontologies as described here. For example, an upstream ETL process may include mapping names/labels included in raw data to a known set of entity names/labels, or the like. Accordingly, in some embodiments, for at least brevity or clarity a detailed description of mapping entities in raw data to domain data entities is omitted here.

At block 1108, in one or more of the various embodiments, model generators may be arranged to determine one or more attributes based on the domain data and attribute ontology. Similar to determining entities described above, model generators may be arranged to determine one or more attributes that may be associated with entities.

At block 1110, in one or more of the various embodiments, model generators may be arranged to determine one or more events based on the domain data and the event ontology. Generally, in some embodiments, events may represent activity that may lead to state changes for entities. Similar to determining entities or attributes, events may be different for different subject matter domains. Accordingly, in some embodiments, model generators may be arranged to employ subject matter domain specific ontologies for determining events.

Next, in one or more of the various embodiments, control may be returned to a calling process.

Figure 12:
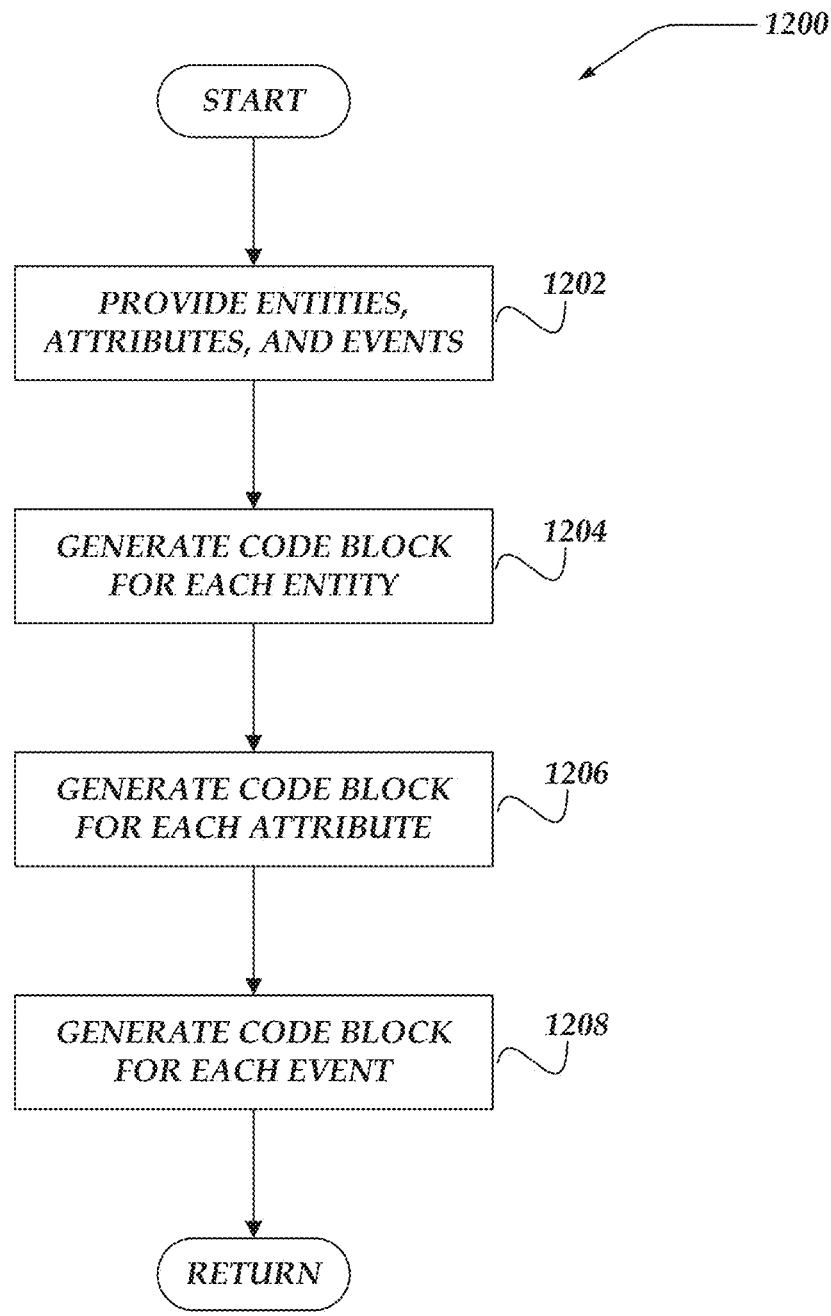
FIG. 12 illustrates a flowchart of a process for automated data preparation, training, or tuning of machine learning models in accordance with one or more of the various embodiments.

FIG. 12 illustrates a flowchart of process 1200 for automated data preparation, training, or tuning of machine learning models in accordance with one or more of the various embodiments. After a start block, at block 1202, in one or more of the various embodiments, one or more entities, one or more attributes, and one or more events may be provided to a model generator. As described herein, in some embodiments, process 1100, or the like may be employed to identify entities, attributes, or events from domain data and schema information.

At block 1204, in one or more of the various embodiments, model generators may be arranged to generate one or more code blocks for each entity. In some embodiments, code blocks may be considered to be query expressions that may be directed to retrieving or identifying entities in the domain data. In some embodiments, the particular format or computer programming language used for representing code blocks may vary depending on the underlying data store used for storing the domain data. For example, in some embodiments, if the domain data may be stored in a relational database, code blocks may be implemented using SQL.

Also, in some embodiments, model generators may be arranged to generate code blocks based on code block templates, or the like, that may be included in entity ontologies. Accordingly, in some embodiments, some code blocks may be associated with other instructions that may be directed to populating particular code block templates.

Further, in some embodiments, model generators may be arranged to employ generative AI systems or LLMs to generate code blocks. Accordingly, in some embodiments, model generators may be arranged to generate one or more prompts that include entities and ask an LLM to generate query expressions that conform to a particular query language.

At block 1206, in one or more of the various embodiments, model generators may be arranged to generate one or more code blocks for each attribute. Similar to generating code blocks for entities, model generators may be arranged to determine code blocks for selecting or identifying particular entity observances that have particular attributes. For example, a general entity code block may be configured to select students from the domain data while an attribute code block may be configured to select prospective students from the domain data.

At block 1208, in one or more of the various embodiments, model generators may be arranged to generate one or more code blocks for each event. Similar to generating code blocks for entities or attributes, model generators may be arranged to determine code blocks for selecting or identifying particular event observances from the domain data and schema information.

Next, in one or more of the various embodiments, control may be returned to a calling process.

Figure 13:
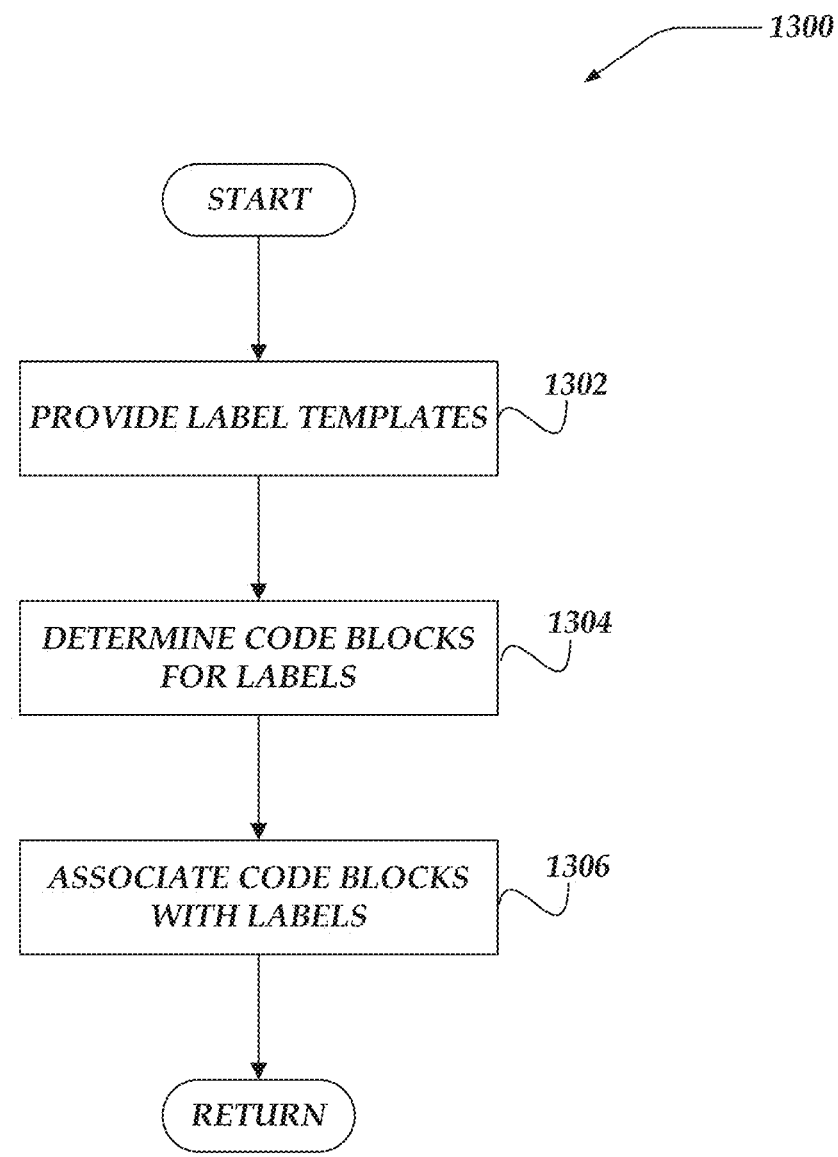
FIG. 13 illustrates a flowchart of a process for automated data preparation, training, or tuning of machine learning models in accordance with one or more of the various embodiments.

FIG. 13 illustrates a flowchart of process 1300 for automated data preparation, training, or tuning of machine learning models in accordance with one or more of the various embodiments. After a start block, at block 1302, in one or more of the various embodiments, one or more label templates may be provided to a model generator. In some embodiments, label templates may be determined from subject matter domain ontologies such that a library of label templates may be developed to predict or infer various outcomes that may be relevant for particular subject matter domains. Also, in some embodiments, model generators may be arranged to provide one or more user interfaces that enable users to add new label templates. In some cases, the new label templates may be unique to a particular organization while in other cases, the new label templates may be discovered to have a more general application within a subject matter domain. Thus, in some embodiments, such label templates may be included in a label template library relevant to the subject matter domain.

At block 1304, in one or more of the various embodiments, model generators may be arranged to determine one or more code blocks to the one or more labels. As described above, labels may be used to identify a portion of entity observances that are associated with a particular outcome. Accordingly, in some embodiments, labels may be associated with one or more code blocks that select or filter the entities, attributes, or events that may be associated with a given label template.

At block 1306, in one or more of the various embodiments, model generators may be arranged to associate the determined code blocks with the one or more labels. In some embodiments, labels may be specific to a given domain data and schema information. Accordingly, in some embodiments, model generators may be arranged to associate labels with the particular code blocks for a given domain data and schema information.

Next, in one or more of the various embodiments, control may be returned to a calling process.

Figure 14:
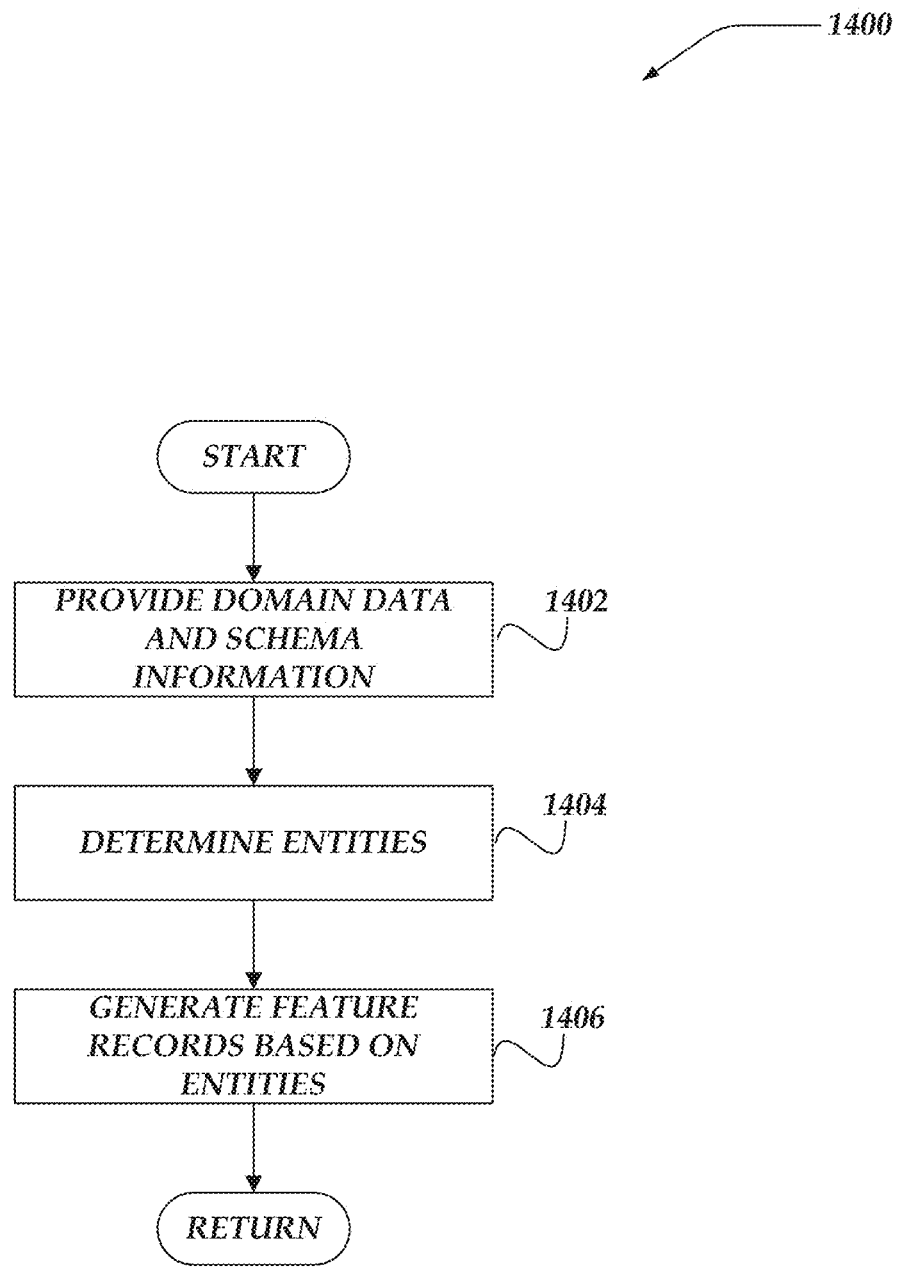
FIG. 14 illustrates a flowchart of a process for automated data preparation, training, or tuning of machine learning models in accordance with one or more of the various embodiments.

FIG. 14 illustrates a flowchart of process 1400 for automated data preparation, training, or tuning of machine learning models in accordance with one or more of the various embodiments. After a start block, at block 1402, in one or more of the various embodiments, domain data and schema information may be provided to model generators. As described above, domain data and schema information may be provided to model generators.

At block 1404, in one or more of the various embodiments, model generators may be arranged to determine one or more entities based on the domain data. As described above, in some embodiments, model generators may be arranged to determine one or more entities that may be included in the domain data.

At block 1406, in one or more of the various embodiments, model generators may be arranged to generate feature records based on the one or more entities. In some embodiments, different machine learning training systems may support different input formats. Accordingly, in some embodiments, model generators may be arranged to conform domain data related to entities into feature records that conform the specifications of a given machine learning model or machine learning model training system. In some embodiments, often feature records may include one or more feature fields that represent the features of a given entity. In some embodiments, model generators may be arranged to be adaptable to different or evolving machine learning specifications. Accordingly, in some embodiments, model generators may be arranged to determine the particular formats for feature records or feature fields based on templates, instructions, rules, or the like, provided via configuration information to account for local circumstances or local requirements.

Also, in some embodiments, model generators may be arranged to generate separate collections of feature records for each entity as directed by a subject matter domain ontology. For example, in some embodiments, if the subject matter domain may be healthcare, separate collections of feature records may be generated for providers, patients, clinic locations, service, or the like. In some embodiments, model generators may be arranged to automatically generate feature records for each entity identified in the domain data.

Next, in one or more of the various embodiments, control may be returned to a calling process.

Figure 15:
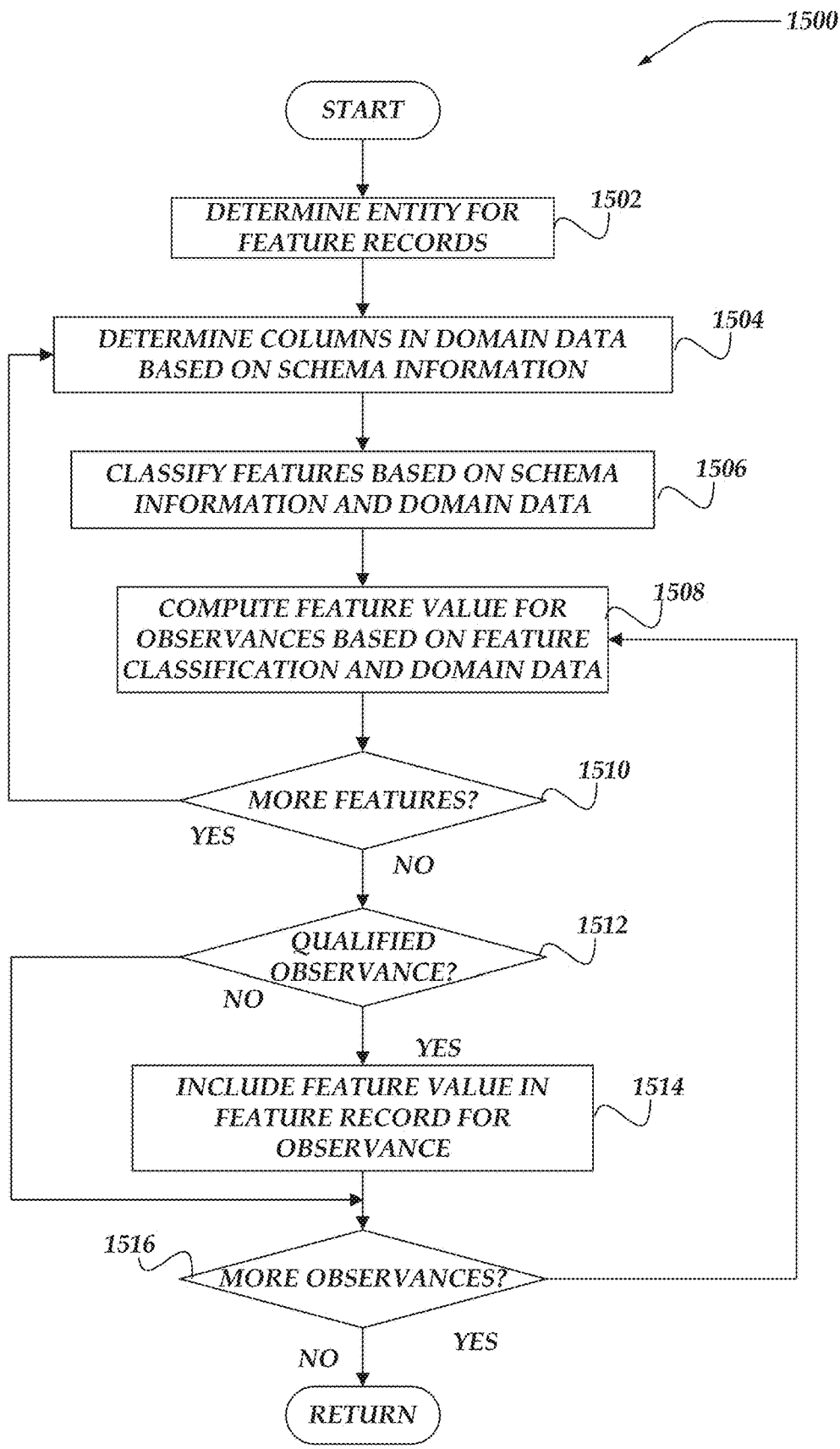
FIG. 15 illustrates a flowchart of a process for automated data preparation, training, or tuning of machine learning models in accordance with one or more of the various embodiments.

FIG. 15 illustrates a flowchart of process 1500 for automated data preparation, training, or tuning of machine learning models in accordance with one or more of the various embodiments. After a start block, at block 1502, in one or more of the various embodiments, model generators may be arranged to determine an entity. As described above, in some embodiments, model generators may be arranged to determine one or more entities from domain data. Accordingly, in some embodiments, model generators may be arranged to iterate through one or more of the determined entities.

In some embodiments, model generators may be arranged to examine data in the domain data that may be related to the entity to determine how to formulate feature records that represent individual observances found in the domain data. In some embodiments, model generators may be arranged to transform the data found in the domain data into flat rows (e.g., vectors) such that a single feature record may provide a representation of the features of the entity that may be relevant for machine learning. In some embodiments, model generators may be arranged to initially generate feature records that include feature fields for every related column that may be determined in the domain data. However, in some embodiments, in some cases, one or more of those feature fields may be considered erroneous or otherwise detrimental to the performance of machine learning models. Accordingly, in some embodiments, model generators may be arranged to perform one or more actions to identify the feature fields that may be causing errors or otherwise degrade the performance of machine learning models.

At block 1504, in one or more of the various embodiments, model generators may be arranged to determine one or more columns in the domain data based on schema information associated with the domain data. In one or more of the various embodiments, domain data may often include one or more tables that have one or more relationships between the tables. Accordingly, in some embodiments, the data representing observances of entities may be spread across one or more tables.

In some embodiments, model generators may be arranged to employ the domain data or schema information to identify the various columns across one or more tables that may be storing values related to the entity under consideration. Typically, in some embodiments, related columns may be determined based on foreign keys from one or more "base" tables that may reference rows in other tables. For example, in some embodiments, a table named "student" may include a foreign key that references rows in another table named address, courses, attendance, or the like.

In some embodiments, each related table may be expected to provide at least one feature field for a feature record. In conventional systems, selecting features from domain data may be manual such that a data scientist may select which features from which table that they may consider to be of interest. Accordingly, in such cases, the personal subjectivity or bias of the data scientist performing the manual feature selection may result in biased or non-performant machine learning models. In contrast, in some embodiments, model generators may include every possible feature into the feature record. Accordingly, in some embodiments, bias or subjectivity may be eliminated or reduced. Note, in some embodiments, model generators may be arranged to perform error detection or error mitigation to determine if one or more feature fields may be causing errors or distortions in trained machine learning models. Accordingly, in some embodiments, model generators may be arranged to perform error detection or mitigation such that undesirable feature fields may be removed as they are discovered.

At block 1506, in one or more of the various embodiments, model generators may be arranged to classify one or more features based on the schema information and domain data. In some embodiments, feature records may be considered flattened representations of entity features. In some cases, domain data may be inherently flat, such as, student ID, total credits, or the like. However, often features such as purchases, courses taken, attendance, grades, or the like, may be represented by a collection of values. Accordingly, in some embodiments, model generators may be arranged to apply an aggregation strategy to represent these features using one or more feature fields in the feature records. Also, in some embodiments, one or more columns in the domain data tables related to the entity may be categorical such that arithmetical aggregation (e.g., mean, median, min, max, or the like) may be inapplicable.

Accordingly, in some embodiments, model generators may be arranged to employ one or more feature rules for representing multi-value features as a single value. As mentioned above, schema information may include information such as concrete data type and functional data type for each column in the domain data. Accordingly, in some embodiments, feature rules may be configured to consider the concrete data type and functional data type to determine how to represent multi-valued features in a feature record. Further, in some embodiments, the application of feature rules may result in multiple feature fields being generated for a single domain data column.

For example, in some embodiments, domain data may include customers and purchases. In this example, customers may have multiple purchases recorded in the domain data. Accordingly, representing information about multiple purchases in a single field may be problematic. In this example, for some embodiments, the purchase column in the domain data may be determined to have a concrete data type of currency, numeric or the like. However, in this example, the function data type for the column may be designated as transaction, item purchase, sale, or the like. Thus, in this example, a particular feature rule may be applied to represent information associated with a customer's individual purchases in the feature record. For example, in some embodiments, a feature rule may be configured to add feature fields such as purchase_last, purchase_last_date, purchase_amount_10day_average, purchase_amount_lifetime_average, purchase_amount_max, purchase_2ndtolast, purchase_date_2ndtolast, or the like. Accordingly, the feature record will include one or more feature fields that represent different aspects or dimensions of the multiple-values in one or more feature fields. Similarly, in some embodiments, if the domain data column may be a category, a feature rule may be configured to generate feature fields that each represent a characteristic of the category column, such as current value, frequency counts, distribution information, mode, or the like.

Also, similarly, if the domain data column is an event date, such as date/time of visit, a feature rule may be configured to include feature fields that represent one or more characteristics, such as, average time between visits, last visit, number of visits in a year, number of visits in last month, distribution of visits across calendar days, or the like.

In general, in some embodiments, feature rules may be configured to be expansive with the intent that feature fields that may distort the performance of a machine learning model may be subsequently identified and removed by error detection and mitigation actions performed by model generators.

At block 1508, in one or more of the various embodiments, model generators may be arranged to compute one or more feature values for entity observances based on the classification of the one or more features and the domain data. In one or more of the various embodiments, model generators may be arranged to employ the feature rules for a domain data column to transform the information/values in the domain data to feature fields in the feature record. In some embodiments, a feature record may be generated for each qualifying observance of the entity.

At decision block 1510, in one or more of the various embodiments, if there may be more features or columns to consider, control may loop back to block 1504; otherwise, control may flow to decision block 1512. In some embodiments, model generators may be arranged to attempt to include values from each domain data column that may be related to the entity being processed in the feature record. In some embodiments, model generators may be arranged to exclude one or more domain data columns from consideration based on its associated concrete data type or functional data type. In some embodiments, in some cases, one or more columns may be designated for exclusion in the schema information, entity ontologies, or the like. Further, in some embodiments, model generators may be arranged to enable users to manually select one or more columns to exclude. Further, in some embodiments, subsequent error detection or error mitigation processes performed by model generators may designate one or more domain data columns to be excluded from feature records. For example, one or more domain data columns associated with information leakage may be determined and designated to exclude from feature records that may be generated in the future.

At decision block 1512, in one or more of the various embodiments, if the observance may be qualified for including feature records, control may flow to block 1514; otherwise, control may flow to decision block 1516. In some embodiments, model generators may be arranged to evaluate the feature fields of a feature record to determine if the feature record should be included in the feature records for the entity under consideration. For example, in some embodiments, while the domain data may be assumed to be cleaned or otherwise prepared to be consumed safely by model generators, there may be one or more observances that are missing data or have erroneous data such that those observances may be excluded feature record segments. In some embodiments, model generators may be arranged to employ instructions, filters, rules, or the like, that may determine if a given observation may be considered qualified for inclusion in feature records. In some embodiments, one or more initial training rounds of machine learning models may include feature records for observances that may later be determined to be unqualified for training or evaluating machine learning models. Accordingly, in some embodiments, model generators may be arranged to employ filters, rules, instructions, or the like, provided via configuration information to determine if observances may be qualified or disqualified to account for local requirements or local circumstances.

At block 1514, in one or more of the various embodiments, model generators may be arranged to include the one or more feature values into a feature record. In some embodiments, feature records may comprise multiple feature fields that may be populated with the values determined for the observance under consideration.

At decision block 1516, in one or more of the various embodiments, if there may be more observances of the entity, control may loop back to block 1508; otherwise, control may be returned to a calling process.

Figure 16:
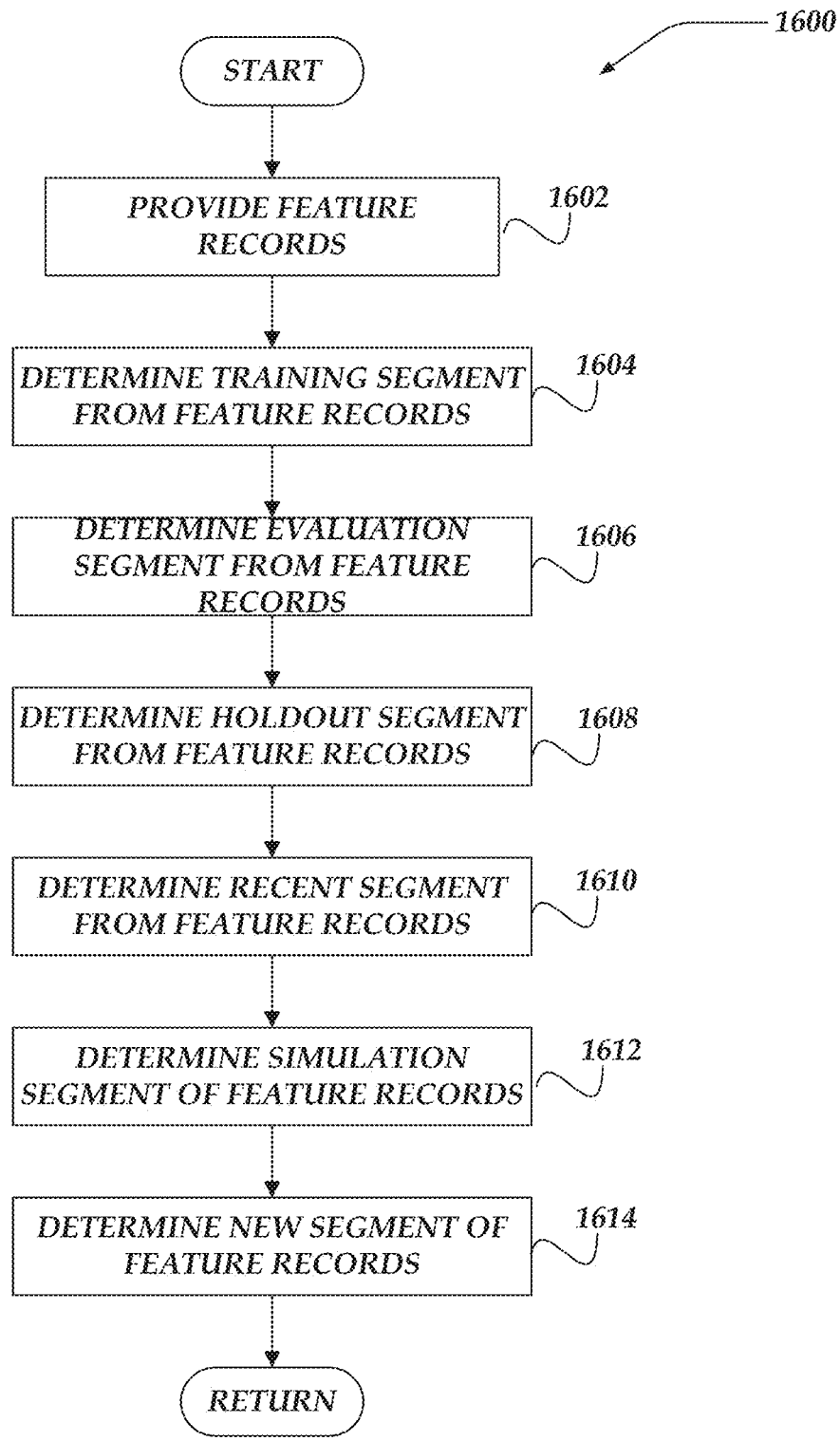
FIG. 16 illustrates a flowchart of a process for automated data preparation, training, or tuning of machine learning models in accordance with one or more of the various embodiments.

FIG. 16 illustrates a flowchart of process 1600 for automated data preparation, training, or tuning of machine learning models in accordance with one or more of the various embodiments. After a start block, at block 1602, in one or more of the various embodiments, a collection of feature records may be provided to model generators. As described above, in some embodiments, model generators may be arranged to generate feature records that represent observances of entities that may be used for training, testing, or validating machine learning models. However, in some embodiments, model generators may be arranged to segment feature records into various segments for use in different operations for training, testing, or validating machine learning models.

At block 1604, in one or more of the various embodiments, model generators may be arranged to determine a training segment from the feature records. In some embodiments, the training segment may be a portion of feature records that may be employed to train a given machine learning model.

At block 1606, in one or more of the various embodiments, model generators may be arranged to determine an evaluation segment from the feature records. In some embodiments, feature records included in the evaluation segment may be employed during training to enable the ongoing progress of the training to be evaluated. Accordingly, in some embodiments, if erroneous results or predictions are indicated early in the process, mitigation steps may be taken before expanding resources for completely training the machine learning model.

At block 1608, in one or more of the various embodiments, model generators may be arranged to determine a holdout segment from the feature records. In some embodiments, holdout segments may include a portion of the feature records that are excluded from the training process. Accordingly, in some embodiments, these feature records may provide a set of information that may be unknown to the trained machine learning model. In some embodiments, the holdout segment may be employed to validate that the quality of predicted outcomes for the trained machine learning model meet the accuracy requirements for a particular application.

At block 1610, in one or more of the various embodiments, model generators may be arranged to determine a recent segment from the feature records. In some embodiments, the recent segment of feature records may include feature records that come from the portion of the domain data that is more recent relative to when the domain data was collected. For example, if the domain data covers a 12-month period, feature records associated with the most recent 3 months may be included in the recent segment. In some embodiments, model generators may be arranged to evaluate machine learning models by comparing predicted outcomes based on some or all feature records with predicted outcomes that are based on the most recent feature records. This comparison may identify flaws in the machine learning model being evaluated such as if the performance of the machine learning model may shift depending on the age of the feature records.

At block 1612, in one or more of the various embodiments, model generators may be arranged to determine a simulation segment from the feature records.

In some embodiments, simulation segments may be based on a combination of the feature records based on domain data and other feature records based on refreshed domain data. In some embodiments, the portion of feature records provided by the original domain data may be used to provide features and the data from the refreshed domain data may be employed to provide labels.

At block 1614, in one or more of the various embodiments, model generators may be arranged to determine a new segment from the feature records. In some embodiments, the new segment may include feature records generated from refreshed domain data. In some embodiments, new segments may include observations which did not exist in the original domain data snapshot. In some embodiments, observations included in new data segments may be observations that were created and resolved in the time-window associated with the refreshed domain data.

Next, in one or more of the various embodiments, control may be returned to a calling process.

Figure 17:
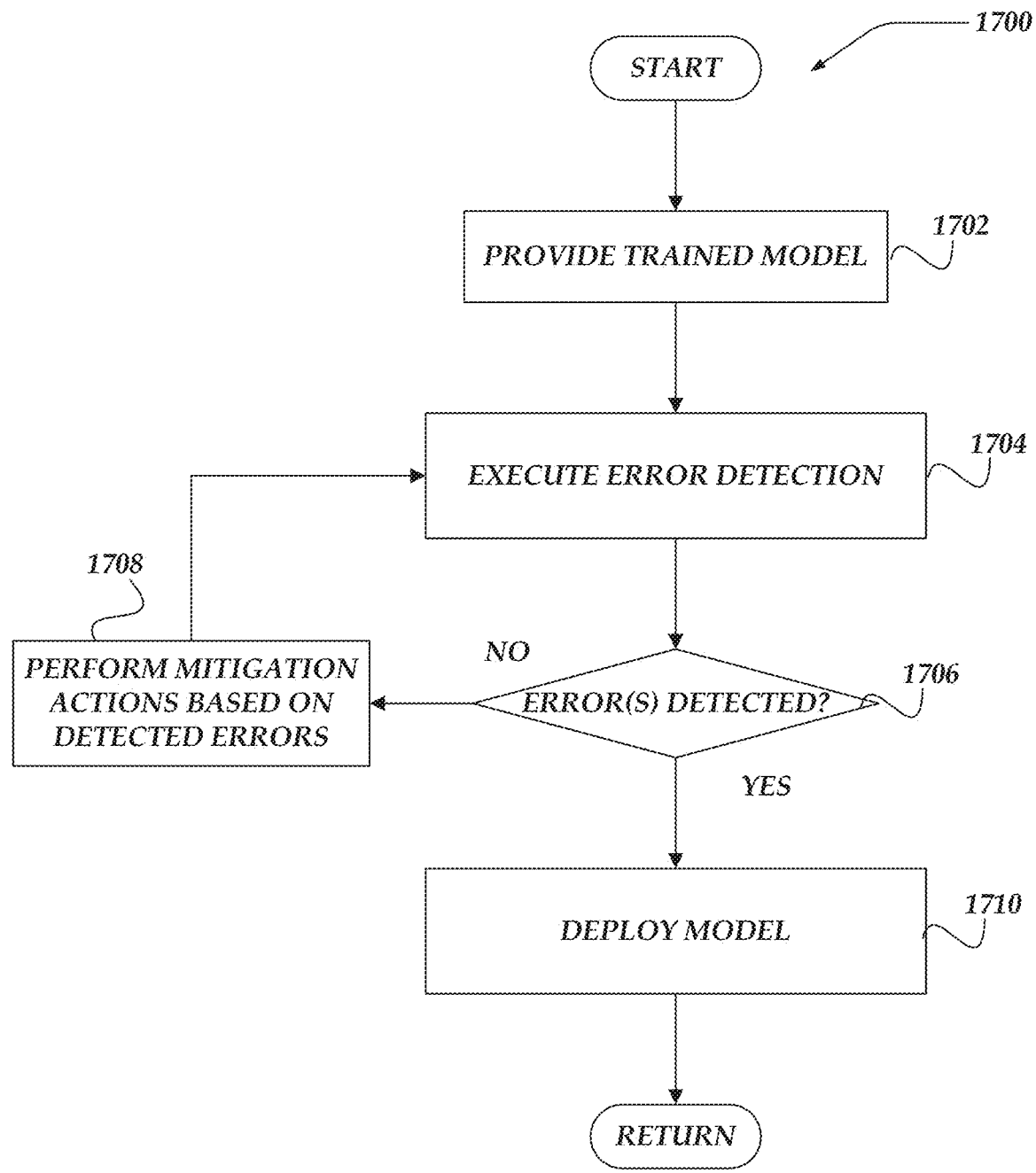
FIG. 17 illustrates a flowchart of a process for automated data preparation, training, or tuning of machine learning models in accordance with one or more of the various embodiments.

FIG. 17 illustrates a flowchart of process 1700 for automated data preparation, training, or tuning of machine learning models in accordance with one or more of the various embodiments. After a start block, at block 1702, in one or more of the various embodiments, trained (or partially) trained machine learning models may be provided to model generators. In some embodiments, trained machine learning models may be considered to be machine learning models that have completed one or more training rounds. In some cases, the trained machine learning model may be a model that has not been used in production (e.g., newly trained). Also, in some embodiments, trained machine learning models may include machine learning models that have been in production for some time.

For example, in some embodiments, a machine learning model may be trained using a training segment of feature records. Then the model may be tested using the holdout segment. Thus, if the holdout segment accurately (to a given standard) predicts outcomes that machine learning model may be considered trained.

At block 1704, in one or more of the various embodiments, model generators may be arranged to execute one or more error detection actions. In some embodiments, if a machine learning model may be trained, there may remain one or more errors embedded in the model.

Accordingly, in some embodiments, model generators may be arranged to evaluate the performance of machine learning models based on comparing the performance of the machine learning model if using different feature record segments.

In most cases, machine learning model errors may be caused by problems with its training data. For example, in some embodiments, the feature records in the training segment may include one or more feature fields from domain data columns that leak the outcome that the machine learning model is being trained to predict.

For example, given a machine learning model trained to predict if a student will graduate in the next year. If the feature records used for training the machine learning model include a feature field that indicates a student's graduation status, a model trained with those feature records may 'cheat' and make the prediction based on the graduation status feature field rather than predicting based on other feature fields.

Accordingly, in some embodiments, model generators may be arranged to perform one or more operations to determine if the trained machine learning model may be harboring errors.

In some embodiments, model generators may be arranged to employ the different feature record segments to identify errors that may be embedded in a machine learning model.

In some embodiments, model generators may be arranged to evaluate the machine learning model using the recent segment of feature records to identify if the machine learning model predicts outcomes with different accuracy for the recent segment as compared with the holdout segment.

In some embodiments, model generators may be arranged to evaluate the machine learning model using the simulation segment of feature records. Such that the simulation segment may include feature records that do not include values that correspond with completing the outcomes being predicted. For example, if the machine learning model is trained to predict which students will graduate, the training segment will include feature records for students that have not graduated as well as students that have graduated. Accordingly, in this example, the simulation segment may be considered to be restricted to feature records of students that had not graduated at the time the original domain data was collected.

However, if a refreshed domain data is provided that generally includes feature records for the same students, predicted outcomes using the feature records from the refreshed domain data may be compared to outcomes predicted using the original data. This may be considered a simulation because predictions made against the original domain data include non-graduated students that may graduate when the refreshed domain data is collected.

Also, in some embodiments, model generators may be arranged to use the new segment of feature records to evaluate machine learning model performance using feature records that were absent from the original domain data. Accordingly, in some embodiments, comparing the performance of the predictions made against the new segment with predictions made for other segments may identify one or more possible errors if the prediction results vary across the different segments. Because, in some embodiments, if a machine learning model is well trained it may be expected that each feature record segment should have similar performance. For example, if the new segment is significantly worse at predicting outcomes, it may indicate that one or more feature fields values that are present in the older domain data may be leaking outcome information to the model.

In some embodiments, model generators may be arranged to identify a type of data leakage commonly referred to as time leakage if there may be variance in prediction accuracy among the recent segment, simulation segment, and new segment. In contrast, the absence of time leakage may indicate if the prediction accuracy for the recent segment, simulation segment, and the new segment may be within a preferred threshold range.

One of ordinary skill in the art will appreciate that model generators may be arranged to incorporate additional error checks or error evaluations that are described herein. For brevity and clarity detailed discussion of techniques for identifying over fitting, under fitting, drift, label errors, or the like, are omitted here.

Further, in some embodiments, organizations may discover one or more other error evaluation methods that may be incorporated into the error detection process. Likewise, in some embodiments, organizations may discover that two or more error evaluation methods may be redundant such that the redundant evaluations may be removed from the error detection process.

Further, in some embodiments, model generators may be adapted to different types of machine learning models. Accordingly, one of ordinary skill in the art will appreciate that model generators may be configured to employ different error evaluators, including those that may be preferred for different types of machine learning models.

Accordingly, in some embodiments, model generators may be arranged to determine some or all of the particular error evaluation operations based on rules, instructions, libraries, or the like, that may be provided by configuration information to account for local circumstances or local requirements.

At decision block 1706, in one or more of the various embodiments, if errors may be detected, control may flow to block 1708; otherwise, control may flow to block 1708.

At block 1708, in one or more of the various embodiments, model generators may be arranged to perform one or more mitigation actions based on the detected errors.

In some embodiments, model generators may be arranged to apply one or more mitigation methods to resolve errors discovered during the error detection process. In some embodiments, different classes of errors may have one or more well-known strategies for mitigation. For example, in some embodiments, over fitting errors may be mitigated by examining the weights that a machine learning model may assign to particular features. Accordingly, in some embodiments, model generators may be arranged to scan the machine learning model to identify feature weights that may be contributing to the error. For example, in some embodiments, model generators may be arranged to employ SHAP values (SHapley Additive exPlanations) to identify one or more feature fields in the feature record that may be contributing to overfitting. Accordingly, in some embodiments, if problematic feature fields may be discovered, model generators may be arranged to exclude those fields from the feature records. One of ordinary skill in the art may refer to this type of mitigation as overfit feature pruning.

Further, in some embodiments, model generators may be arranged to determine if one or more feature fields in the feature records include values that have a high percentage of changes relative to other feature fields in the feature records. Accordingly, in some embodiments, these feature fields may be excluded from feature records. One of ordinary skill in the art may refer to this type of mitigation as high-change feature pruning.

In some embodiments, model generators may be arranged to apply various mitigation actions depending on the type of errors detected. Accordingly, in some embodiments, model generators may be arranged to employ a library of mitigation actions that may be applied as needed. Further, in some embodiments, model generators may be arranged to enable additional mitigation actions to be brought into service via libraries, rules, instructions, or the like, provided via configuration information to account for local requirements or local circumstances. Accordingly, for brevity and clarity detailed discussion of additional mitigation actions is omitted here.

At block 1710, In some embodiments, model generators may be arranged to deploy the trained machine learning model.

In some embodiments, model generators may be arranged to designate the trained machine learning model as being ready for deployment in a production environment. Accordingly, in some embodiments, the machine learning models may be made available for integration into one or more production environments.

In some embodiments, model generators may be arranged to periodically evaluate deployed machine learning models to check for prediction errors that may be developed overtime.

Next, in one or more of the various embodiments, control may be returned to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of these innovations.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of these innovations.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for managing machine learning models in a network using one or more processors to execute instructions that are configured to cause actions, comprising:
   determining a plurality of domain items based on domain data and associated schema information;
   generating one or more labels that correspond to a predicted outcome based on the domain data, wherein each label is associated with one or more code blocks, and wherein execution of each code block selects a portion of the plurality of domain items having an association with the predicted outcome;
   training a model based on a portion of a plurality of feature records and the one or more labels, wherein each feature record is associated with an observance of a domain item; and
   disqualifying the trained model based on one or more evaluation metrics that are below a threshold value, wherein the disqualification causes further actions, including:
      submitting one or more other portions of the plurality of feature records to the disqualified model, wherein the one or more other portions of feature records exclude the portion of feature records used to train the model;
      determining one or more erroneous feature fields in the plurality of feature records based on one or more metrics associated with the submission of the one or more other portions of the plurality of feature records;
      updating the plurality of feature records to exclude the one or more erroneous feature fields; and
      retraining the disqualified model based on the plurality of updated feature records.

2. The method of claim 1, further comprising:
   determining one or more entities, one or more attributes, or one or more events included in the plurality of domain items based on one or more ontologies associated with a subject matter associated with the domain data;
   associating one or more of an entity, an attribute, or an event with each label based on the predicted outcome associated with each label;
   associating a first portion of the code blocks with each label based on one or more entities associated with the label;
   associating a second portion of the code blocks with each label based on one or more attributes associated with the label; and
   associating a third portion of the code blocks with each label based on one or more events associated with the label.

3. The method of claim 1, further comprising:
   determining two or more tables in the domain data that are associated with one or more entities based on the schema information;
   generating a portion of the plurality of feature records based on the two or more tables, wherein each feature record includes one or more feature fields;
   determining a value for each feature field based on the two or more tables, wherein each feature field value is associated with one or more row values from the two or more tables.

4. The method of claim 1, wherein generating the one or more labels further comprises:
   determining a simulation date associated with the predicted outcome for each label based on the domain data, wherein a negative outcome is predicted for one or more events that occur before the simulation date, and wherein a positive outcome is predicted for the one or more events that occur after the simulation date.

5. The method of claim 1, wherein determining the one or more erroneous feature fields, further comprises:
   segmenting the plurality of feature records into one or more of a training segment, a recent segment, or a simulation segment based on the one or more labels and the domain data;
   generating refreshed domain data that includes data collected subsequent to a collection of the data for the domain data;
   generating a new segment based on a plurality of other feature records that are derived from the refreshed domain data;
   evaluating one or more outcomes predicted by the disqualified model based on a submission of one or more feature records associated with one or more of the training segment, the recent segment, the simulation segment, or the new segment; and
   generating the one or more metrics based on the evaluation, wherein the one or more metrics indicate one or more of a label leakage, time leakage, data leakage, overfitting, underfitting, or drift.

6. The method of claim 1, wherein generating the one or more labels, further comprises:
   determining one or more events that represent one or more phenomena that are actively chosen by one or more populations represented in the domain data;
   determining one or more other events that represent one or more phenomena that occur passively to the one or more populations represented in the domain data; and
   determining one or more other events that represent one or more phenomena that are implied to occur to the one or more populations represented in the domain data, wherein direct observation of the one or more implied phenomena is unavailable in the domain data.

7. The method of claim 1, further comprising:
   determining one or more time horizons associated with one or more events included in the domain data, wherein each time horizon is one or more of a sliding time horizon, or a triggered time horizon; and
   associating each label with the one or more time horizons, wherein the predicted outcome is predicted to occur within the one or more time horizons.

8. A network computer for managing machine learning models, comprising:
   a memory that stores at least instructions; and
   one or more processors that execute instructions that are configured to cause actions, including:
      determining a plurality of domain items based on domain data and associated schema information;
      generating one or more labels that correspond to a predicted outcome based on the domain data, wherein each label is associated with one or more code blocks, and wherein execution of each code block selects a portion of the plurality of domain items having an association with the predicted outcome;
      training a model based on a portion of a plurality of feature records and the one or more labels, wherein each feature record is associated with an observance of a domain item; and
      disqualifying the trained model based on one or more evaluation metrics that are below a threshold value, wherein the disqualification causes further actions, including:
         submitting one or more other portions of the plurality of feature records to the disqualified model, wherein the one or more other portions of feature records exclude the portion of feature records used to train the model;
         determining one or more erroneous feature fields in the plurality of feature records based on one or more metrics associated with the submission of the one or more other portions of the plurality of feature records;
         updating the plurality of feature records to exclude the one or more erroneous feature fields; and
         retraining the disqualified model based on the plurality of updated feature records.

9. The network computer of claim 8, wherein the one or more processors execute instructions that are configured to cause performance of actions, further comprising:
   determining one or more entities, one or more attributes, or one or more events included in the plurality of domain items based on one or more ontologies associated with a subject matter associated with the domain data;
   associating one or more of an entity, an attribute, or an event with each label based on the predicted outcome associated with each label;
   associating a first portion of the code blocks with each label based on one or more entities associated with the label;
   associating a second portion of the code blocks with each label based on one or more attributes associated with the label; and
   associating a third portion of the code blocks with each label based on one or more events associated with the label.

10. The network computer of claim 8, wherein the one or more processors execute instructions that are configured to cause performance of actions, further comprising:
   determining two or more tables in the domain data that are associated with one or more entities based on the schema information;
   generating a portion of the plurality of feature records based on the two or more tables, wherein each feature record includes one or more feature fields;
   determining a value for each feature field based on the two or more tables, wherein each feature field value is associated with one or more row values from the two or more tables.

11. The network computer of claim 8, wherein generating the one or more labels further comprises:
   determining a simulation date associated with the predicted outcome for each label based on the domain data, wherein a negative outcome is predicted for one or more events that occur before the simulation date, and wherein a positive outcome is predicted for the one or more events that occur after the simulation date.

12. The network computer of claim 8, wherein determining the one or more erroneous feature fields, further comprises:

segmenting the plurality of feature records into one or more of a training segment, a recent segment, or a simulation segment based on the one or more labels and the domain data;
generating refreshed domain data that includes data collected subsequent to a collection of the data for the domain data;
generating a new segment based on a plurality of other feature records that are derived from the refreshed domain data;
evaluating one or more outcomes predicted by the disqualified model based on a submission of one or more feature records associated with one or more of the training segment, the recent segment, the simulation segment, or the new segment; and
generating the one or more metrics based on the evaluation, wherein the one or more metrics indicate one or more of a label leakage, time leakage, data leakage, overfitting, underfitting, or drift.

13. The network computer of claim 8, wherein generating the one or more labels, further comprises:
determining one or more events that represent one or more phenomena that are actively chosen by one or more populations represented in the domain data;
determining one or more other events that represent one or more phenomena that occur passively to the one or more populations represented in the domain data; and
determining one or more other events that represent one or more phenomena that are implied to occur to the one or more populations represented in the domain data, wherein direct observation of the one or more implied phenomena is unavailable in the domain data.

14. The network computer of claim 8, wherein the one or more processors execute instructions that are configured to cause performance of actions, further comprising:
determining one or more time horizons associated with one or more events included in the domain data, wherein each time horizon is one or more of a sliding time horizon, or a triggered time horizon; and
associating each label with the one or more time horizons, wherein the predicted outcome is predicted to occur within the one or more time horizons.

15. A processor readable non-transitory storage media that includes instructions configured for managing machine learning models over a network, wherein execution of the instructions by one or more processors on one or more network computers performs actions, comprising:
determining a plurality of domain items based on domain data and associated schema information;
generating one or more labels that correspond to a predicted outcome based on the domain data, wherein each label is associated with one or more code blocks, and wherein execution of each code block selects a portion of the plurality of domain items having an association with the predicted outcome;
training a model based on a portion of a plurality of feature records and the one or more labels, wherein each feature record is associated with an observance of a domain item; and
disqualifying the trained model based on one or more evaluation metrics that are below a threshold value, wherein the disqualification causes further actions, including:
submitting one or more other portions of the plurality of feature records to the disqualified model, wherein the one or more other portions of feature records exclude the portion of feature records used to train the model;
determining one or more erroneous feature fields in the plurality of feature records based on one or more metrics associated with the submission of the one or more other portions of the plurality of feature records;
updating the plurality of feature records to exclude the one or more erroneous feature fields; and
retraining the disqualified model based on the plurality of updated feature records.

16. The media of claim 15, further comprising:
determining one or more entities, one or more attributes, or one or more events included in the plurality of domain items based on one or more ontologies associated with a subject matter associated with the domain data;
associating one or more of an entity, an attribute, or an event with each label based on the predicted outcome associated with each label;
associating a first portion of the code blocks with each label based on one or more entities associated with the label;
associating a second portion of the code blocks with each label based on one or more attributes associated with the label; and
associating a third portion of the code blocks with each label based on one or more events associated with the label.

17. The media of claim 15, further comprising:
determining two or more tables in the domain data that are associated with one or more entities based on the schema information;
generating a portion of the plurality of feature records based on the two or more tables, wherein each feature record includes one or more feature fields;
determining a value for each feature field based on the two or more tables, wherein each feature field value is associated with one or more row values from the two or more tables.

18. The media of claim 15, wherein generating the one or more labels further comprises:
determining a simulation date associated with the predicted outcome for each label based on the domain data, wherein a negative outcome is predicted for one or more events that occur before the simulation date, and wherein a positive outcome is predicted for the one or more events that occur after the simulation date.

19. The media of claim 15, wherein determining the one or more erroneous feature fields, further comprises:
segmenting the plurality of feature records into one or more of a training segment, a recent segment, or a simulation segment based on the one or more labels and the domain data;
generating refreshed domain data that includes data collected subsequent to a collection of the data for the domain data;
generating a new segment based on a plurality of other feature records that are derived from the refreshed domain data;
evaluating one or more outcomes predicted by the disqualified model based on a submission of one or more feature records associated with one or more of the training segment, the recent segment, the simulation segment, or the new segment; and generating the one or more metrics based on the evaluation, wherein the one or more metrics indicate one or more of a label leakage, time leakage, data leakage, overfitting, underfitting, or drift.

20. The media of claim 15, wherein generating the one or more labels, further comprises:
determining one or more events that represent one or more phenomena that are actively chosen by one or more populations represented in the domain data;
determining one or more other events that represent one or more phenomena that occur passively to the one or more populations represented in the domain data; and
determining one or more other events that represent one or more phenomena that are implied to occur to the one or more populations represented in the domain data, wherein direct observation of the one or more implied phenomena is unavailable in the domain data.

21. The media of claim 15, further comprising:
determining one or more time horizons associated with one or more events included in the domain data, wherein each time horizon is one or more of a sliding time horizon, or a triggered time horizon; and
associating each label with the one or more time horizons, wherein the predicted outcome is predicted to occur within the one or more time horizons.

22. A system for managing machine learning models comprising:
a network computer, comprising:
a memory that stores at least instructions; and
one or more processors that execute instructions that are configured to cause performance of actions, including:
determining a plurality of domain items based on domain data and associated schema information;
generating one or more labels that correspond to a predicted outcome based on the domain data, wherein each label is associated with one or more code blocks, and wherein execution of each code block selects a portion of the plurality of domain items having an association with the predicted outcome;
training a model based on a portion of a plurality of feature records and the one or more labels, wherein each feature record is associated with an observance of a domain item; and
disqualifying the trained model based on one or more evaluation metrics that are below a threshold value, wherein the disqualification causes further actions, including:
submitting one or more other portions of the plurality of feature records to the disqualified model, wherein the one or more other portions of feature records exclude the portion of feature records used to train the model;
determining one or more erroneous feature fields in the plurality of feature records based on one or more metrics associated with the submission of the one or more other portions of the plurality of feature records;
updating the plurality of feature records to exclude the one or more erroneous feature fields; and
retraining the disqualified model based on the plurality of updated feature records; and
one or more client computers, comprising:
a memory that stores at least instructions; and
one or more processors that execute instructions that are configured to cause performance of other actions, including:
displaying a user interface for selecting one or more of the domain data or the one or more labels.

23. The system of claim 22, wherein the one or more network computer processors execute instructions that are configured to cause performance of actions, further comprising:
determining one or more entities, one or more attributes, or one or more events included in the plurality of domain items based on one or more ontologies associated with a subject matter associated with the domain data;
associating one or more of an entity, an attribute, or an event with each label based on the predicted outcome associated with each label;
associating a first portion of the code blocks with each label based on one or more entities associated with the label;
associating a second portion of the code blocks with each label based on one or more attributes associated with the label; and
associating a third portion of the code blocks with each label based on one or more events associated with the label.

24. The system of claim 22, wherein the one or more network computer processors execute instructions that are configured to cause performance of actions, further comprising:
determining two or more tables in the domain data that are associated with one or more entities based on the schema information;
generating a portion of the plurality of feature records based on the two or more tables, wherein each feature record includes one or more feature fields;
determining a value for each feature field based on the two or more tables, wherein each feature field value is associated with one or more row values from the two or more tables.

25. The system of claim 22, wherein generating the one or more labels further comprises:
determining a simulation date associated with the predicted outcome for each label based on the domain data, wherein a negative outcome is predicted for one or more events that occur before the simulation date, and wherein a positive outcome is predicted for the one or more events that occur after the simulation date.

26. The system of claim 22, wherein determining the one or more erroneous feature fields, further comprises:
segmenting the plurality of feature records into one or more of a training segment, a recent segment, or a simulation segment based on the one or more labels and the domain data;
generating refreshed domain data that includes data collected subsequent to a collection of the data for the domain data;
generating a new segment based on a plurality of other feature records that are derived from the refreshed domain data;
evaluating one or more outcomes predicted by the disqualified model based on a submission of one or more feature records associated with one or more of the training segment, the recent segment, the simulation segment, or the new segment; and
generating the one or more metrics based on the evaluation, wherein the one or more metrics indicate one or more of a label leakage, time leakage, data leakage, overfitting, underfitting, or drift.

27. The system of claim 22, wherein generating the one or more labels, further comprises:
    determining one or more events that represent one or more phenomena that are actively chosen by one or more populations represented in the domain data;
    determining one or more other events that represent one or more phenomena that occur passively to the one or more populations represented in the domain data; and
    determining one or more other events that represent one or more phenomena that are implied to occur to the one or more populations represented in the domain data, wherein direct observation of the one or more implied phenomena is unavailable in the domain data.

28. The system of claim 22, wherein the one or more network computer processors execute instructions that are configured to cause performance of actions, further comprising:
    determining one or more time horizons associated with one or more events included in the domain data, wherein each time horizon is one or more of a sliding time horizon, or a triggered time horizon; and
    associating each label with the one or more time horizons, wherein the predicted outcome is predicted to occur within the one or more time horizons.

* * * * *